(12) United States Patent
Matsumoto

(10) Patent No.: US 7,656,596 B2
(45) Date of Patent: Feb. 2, 2010

(54) LENS APPARATUS AND IMAGE PICKUP APPARATUS

(75) Inventor: Kenichi Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/887,741

(22) PCT Filed: Mar. 24, 2006

(86) PCT No.: PCT/JP2006/306768

§ 371 (c)(1),
(2), (4) Date: Dec. 9, 2008

(87) PCT Pub. No.: WO2006/109587

PCT Pub. Date: Oct. 19, 2006

(65) Prior Publication Data

US 2009/0128931 A1    May 21, 2009

(30) Foreign Application Priority Data

Apr. 8, 2005    (JP)    ............... 2005-112531

(51) Int. Cl.
    *G02B 7/02*    (2006.01)
(52) U.S. Cl. .................. 359/826; 359/822; 359/704
(58) Field of Classification Search .................. 359/826
    See application file for complete search history.

(56) References Cited

U.S. PATENT DOCUMENTS

| | | | |
|---|---|---|---|
| 4,190,325 A | 2/1980 | Moreno | |
| 4,709,311 A | 11/1987 | Bornhorst | |
| 5,052,781 A * | 10/1991 | Iizuka | ........................ 359/823 |
| 5,483,384 A * | 1/1996 | Takizawa et al. | ............. 359/827 |
| 6,288,848 B1 * | 9/2001 | Shinohara et al. | ........... 359/696 |
| 7,102,837 B2 * | 9/2006 | Hamasaki et al. | ........... 359/823 |
| 2004/0008421 A1 | 1/2004 | Yoshida et al. | |

FOREIGN PATENT DOCUMENTS

| | | |
|---|---|---|
| DE | 196 42 796 A1 | 5/1997 |
| JP | 11-084210 | 3/1999 |

OTHER PUBLICATIONS

International Search Report (PCT/ISA/210); International Application No. PCT/JP2006/306768; Dated: Jun. 16, 2006.

* cited by examiner

*Primary Examiner*—Jessica T Stultz
(74) *Attorney, Agent, or Firm*—Rader, Fishman & Grauer PLLC

(57) ABSTRACT

A lens apparatus and image pickup apparatus thereof. The lens apparatus includes a first fixed lens-barrel with fixed-side first guide grooves and fixed-side second guide grooves, a first movable lens-barrel arranged at the outside of the fixed lens-barrel, movable-side first guide grooves, a second movable lens-barrel arranged at the inside of the fixed lens barrel, and movable-side guide grooves. Three first rolling element units are provided between the fixed-side guide grooves and the movable-side first guide grooves, and three second rolling element units are provided between the fixed-side second guide grooves and the movable-side second guide grooves. The first movable lens-barrels and the second movable lens-barrels are supported to the one-group lens and the two-group lens in such a manner that they can be independently moved in the optical axis directions of the first and second lenses.

9 Claims, 13 Drawing Sheets

LENS APPARATUS AND IMAGE PICKUP APPARATUS

TECHNICAL FIELD

The present invention relates to a lens apparatus consisting of a fixed lens-barrel, first and second movable lens-barrels fitted into the inside and the outside of the fixed lens-barrel and more than two rolling element units provided between the first and second movable lens-barrels so that a plurality of movable lens-barrels can be moved straight and an image pickup apparatus including such a lens apparatus.

BACKGROUND ART

Cited Patent Reference 1, for example, has described an example of this kind of lens apparatus according to the related art. Specifically, the Cited Patent Reference 1 has described a linear actuator, an optical device and a lens-barrel for driving an image pickup lens in an image pickup apparatus such as a camera and a video camera. The lens-barrel described in this Cited Patent Reference 1 is characterized in that this lens-barrel uses a linear actuator in which a moving lens group movable in the optical axis direction, a lens holding means for holding the moving lens group and which can be freely slid along a guide in the optical axis direction, a drive means for driving this lens holding means and a position detecting means are provided at the four corners of the lens-barrel around the moving lens group in the optical axis directions.

According to the lens-barrel having the above-mentioned arrangement described in the Cited Patent Reference 1, there can be expected such effects in which while a bad influence exerted upon magnetism from a magnetic circuit can be decreased to the minimum, the lens-barrel can be reduced in size in the width direction by effectively using vacant spaces of the four corners of the lens-barrel and the lens-barrel can be made compact in size.

Cited Patent Reference 2, for example, has described other example of a lens apparatus according to the related art. Specifically, the Cited Patent Reference 2 has described a lens-barrel for use with a still camera and a video camera. The lens-barrel described in the Cited Patent Reference 2 is characterized in that it includes a movable lens-barrel with a lens held thereon movable in the optical axis direction and which includes a plurality of guide grooves parallel to the optical axis, a fixed lens-barrel having a plurality of second guide grooves opposing to the first guide grooves and which are parallel to the optical axis and a plurality of hard balls sandwiched between the opposing first and second guide grooves.

According to the lens-barrel having the above-mentioned arrangement described in the Cited Patent Reference 2, there can be expected such effects in which the hard balls are sandwiched between the guide grooves parallel to the optical axis so that the movable lens-barrel can be moved forward and backward very smoothly.

Cited Patent Reference 3 has described a further example of a lens apparatus according to the related art. Specifically, the Cited Patent Reference 3 has described a lens-barrel apparatus and a drive apparatus for driving a driven body which can be applied to a lens system of a video camera and the like. The lens-barrel apparatus described in the Cited Patent Reference 3 is characterized in that it includes a lens-barrel, a lens located within the lens-barrel, a holding means for holding the lens, the holding means including a coil, a yoke located within the lens-barrel in response to the circumference of the holding means, a magnet located within the yoke to move the holding means within the lens-barrel, the magnet constructing a linear actuator together with the coil when the coil is energized and a guide means for driving the linear actuator to guide the holding means of the lens along the lens-barrel, the guide means located at the position inside the radius direction as compared with the yoke, the magnet and the coil.

According to the lens-barrel apparatus having the above-mentioned arrangement described in the Cited Patent Reference 3, there can be achieved the effects in which the guide means such as a guide shaft need not be located at the outside of the lens-barrel apparatus so that the outer shape of the lens-barrel apparatus can be simplified.

[Cited Patent Reference 1]: Japanese Published Patent Application No. 11-150972
[Cited Patent Reference 2]: Japanese Published Patent Application No. 8-29656
[Cited Patent Reference 3]: Japanese Published Patent Application No. 8-15593

However, in the related-art lens apparatus using the linear actuator as the driving means, as shown in the Cited Patent Reference 1, it has been customary for most of the lens apparatus to hold the lens hold frame by using the guide shaft. For this reason, it has been customary that the coil of the driving means is fixed to the place of one portion distant from the center of the optical axis of the movable lens holding frame with a constant distance. Also, it has been customary that the permanent magnet and the yoke of the driving means are located so as to pass through the coil or they are located distant from the coil with a constant distance, that is, the permanent and the yoke are of the so-called coil moving system.

On the other hand, although there is a magnet moving system for moving the permanent magnet and the yoke while the coil is being fixed, the place in which the magnet moving system is located is the same as that in which the coil moving system is located. In such case, it is unavoidable that a part of the lens-barrel is projected or that the outer shape of the lens-barrel becomes angular. As a consequence, a part of the lens-barrel is unavoidably increased in thickness and hence it has been difficult to make the lens-barrel become cylinder with a small diameter, thereby making it difficult to miniaturize the whole of the image pickup apparatus. Further, since most of the lens-barrel uses a ring-like coil having a rectangular shape as a coil and the effective portion of the ring-like coil as the magnetic circuit is only one side of the rectangular, it is inevitable that a magnetic loss becomes large from a standpoint of circuit efficiency of the magnetic circuit.

Also, while some related-art lens apparatus had a ring-like coil located at the outer peripheral side of the lens, such related-art lens apparatus had a structure in which a yoke is formed of a different member, the yoke being inserted into the lens-barrel. As a result, the lens-barrel was increased in thickness, the whole of the apparatus was increased in size unavoidably and driving efficiency was not satisfactory.

On the other hand, a related-art collapsible type lens apparatus will be considered. It has been customary for a collapsible type lens apparatus that a lens holding frame with a cam pin restricted by a linearly movable lens-barrel rotates a cam ring with a cam groove to allow the cam pin to trace the cam groove, thereby the linearly movable lens-barrel to be collapsed. In this case, since frictional resistance generated when the linearly movable lens-barrel is slidably moved is extremely large, it has been customary that the collapsible type lens apparatus can be collapsed by using a DC motor which generates large torque, reduction torque increased by a gear arrangement or by manual operations. Accordingly, it has been difficult to collapse the collapsible type lens apparatus by a linear motor. Furthermore, when the collapsible type lens apparatus is provided with the gear arrangement or motors are separately mounted on the collapsible type lens apparatus, it is unavoidable that the outer shape of the lens-barrel of the lens is increased in thickness. As a result, the whole of the collapsible type lens apparatus might not be miniaturized and decreased in diameter as one wants it to be.

The problems which the present invention will solve and with which the related-art lens apparatus encountered will be described below. In the lens apparatus according to the related art, it has been difficult to miniaturize the lens-barrel of the lens while a plurality of lens holding frames is being made movable. In order to reliably move the movable lens-barrel forward and backward, it is necessary to increase an output from a drive mechanism. To this end, it is unavoidable that the whole of the lens apparatus becomes large in size. In particular, when movable lens-barrels are provided at the inside and the outside of a fixed lens-barrel so that a plurality of movable lens-barrels can be moved forward and backward, the lens apparatus is increased in length in the optical axis direction or it is increased in length in the direction perpendicular to the optical axis direction. Therefore, it was difficult to miniaturize the whole of the lens apparatus.

DISCLOSURE OF THE INVENTION

According to an aspect of the present invention, there is provided a lens apparatus which is comprised of a fixed lens-barrel including a plurality of fixed-side first guide grooves extended straight and which are formed on an outer peripheral surface in parallel to each other and a plurality of second guide grooves extended straight and which are formed on an inner peripheral surface in parallel to each other, a first movable lens-barrel to hold a first lens at the outside of the fixed lens-barrel and which includes a plurality of movable-side first guide grooves extended straight, a plurality of movable-side first guide grooves being opposed to the fixed-side first guide grooves with a predetermined gap in parallel to each other, a second movable lens-barrel to hold a second lens of which optical axis is coincident with that of the first lens at the inside of the fixed lens barrel and which includes a plurality of movable-side second guide grooves extended straight, a plurality of movable-side second guide grooves being opposed to the fixed-side second guide grooves with a predetermined gap in parallel to each other, more than two first rolling element units including a plurality of rolling elements being provided between the fixed-side first guide grooves and the movable-side first guide grooves so as to become able to freely roll and which supports the first movable lens-barrel to the fixed lens-barrel such that the movable lens-barrel can be moved in the optical axis direction of the lens and more than two second rolling element units including a plurality of rolling elements provided between the fixed-side second guide grooves and the movable-side second guide grooves so as to become able to freely roll and which supports the second movable lens-barrel to the fixed lens-barrel such that the second movable lens-barrel can be moved in the optical axis direction of the lens, wherein the first and second movable lens-barrels are supported to the fixed lens-barrel such that they can be independently moved in the optical axis directions of the first and second lenses.

In accordance with another aspect of the present invention, there is provided an image pickup apparatus which is comprised of a lens apparatus which includes a fixed lens-barrel including a plurality of fixed-side first guide grooves extended straight and which are formed on an outer peripheral surface in parallel to each other and a plurality of second guide grooves extended straight and which are formed on an inner peripheral surface in parallel to each other, a first movable lens-barrel to hold a first lens at the outside of the fixed lens-barrel and which includes a plurality of movable-side first guide grooves extended straight, a plurality of movable-side first guide grooves being opposed to the fixed-side first guide grooves with a predetermined gap in parallel to each other, a second movable lens-barrel to hold a second lens of which optical axis is coincident with that of the first lens at the inside of the fixed lens barrel and which includes a plurality of movable-side second guide grooves extended straight, a plurality of movable-side second guide grooves being opposed to the fixed-side second guide grooves with a predetermined gap in parallel to each other, more than two first rolling element units including a plurality of rolling elements being provided between the fixed-side first guide grooves and the movable-side first guide grooves so as to become able to freely roll and which supports the first movable lens-barrel to the fixed lens-barrel such that the movable lens-barrel can be moved in the optical axis direction of the lens and more than two second rolling element units including a plurality of rolling elements provided between the fixed-side second guide grooves and the movable-side second guide grooves so as to become able to freely roll and which supports the second movable lens-barrel to the fixed lens-barrel such that the second movable lens-barrel can be moved in the optical axis direction of the lens, wherein the lens apparatus supports the first and second movable lens-barrels to the fixed lens-barrel such that they can be independently moved in the optical axis directions of the first and second lenses.

According to the lens apparatus and the image pickup apparatus of the present invention, although the lens apparatus is small in size, it is able to move a plurality of movable lens-barrels straight reliably and smoothly. Thus, it is possible to provide the small lens apparatus which can be driven linearly and the image pickup apparatus including the lens apparatus.

A small lens apparatus which can reliably and smoothly drive a plurality of movable lens-barrels linearly and an image pickup apparatus including such lens apparatus can be realized by simple arrangements.

BRIEF DESCRIPTION OF DRAWINGS

FIGS. 10A and 10B are respectively cross-sectional views of the lens apparatus according to the present invention, wherein FIG. 10A is a cross-sectional view to which reference will be made in explaining the state in which a first movable lens barrel is extended from the lens apparatus; and FIG. 10B is a cross-sectional view to which reference will be made in explaining the state in which a second movable lens barrel also is extended from the lens apparatus in addition to the first movable lens barrel;

FIGS. 11A, 11B and 11C are explanatory diagrams showing other embodiments of the lens barrel supporting structure of the lens apparatus according to the present invention, wherein FIGS. 11A, 11B and 11C are explanatory diagrams showing the states in which a movable lens barrel is supported to a fixed lens barrel by three rolling element units located at the three positions of the lens apparatus, respectively;

FIGS. 12A, 12B, 12C and 12D are explanatory diagrams showing further embodiments of the lens barrel supporting structure of the lens apparatus according to the present invention, wherein FIGS. 12A, 12B, 12C and 12D are explanatory diagrams showing the state in which the movable lens barrel is supported to the fixed lens barrel by four rolling element units located at four positions of the lens apparatus, respectively;

FIGS. 13A, 13B, 13C and 13D are explanatory diagrams showing still further embodiments of the lens barrel supporting structure of the lens apparatus according to the present invention, wherein FIGS. 13A, 13B, 13C and 13D are explanatory diagrams showing the state in which the movable lens barrel is supported to the fixed lens barrel by two rolling element units located at the two positions of the lens apparatus, respectively.

BEST MODE FOR CARRYING OUT THE INVENTION

The embodiments of the present invention will hereinafter be described with reference to the accompanying drawings.

Figure 3:
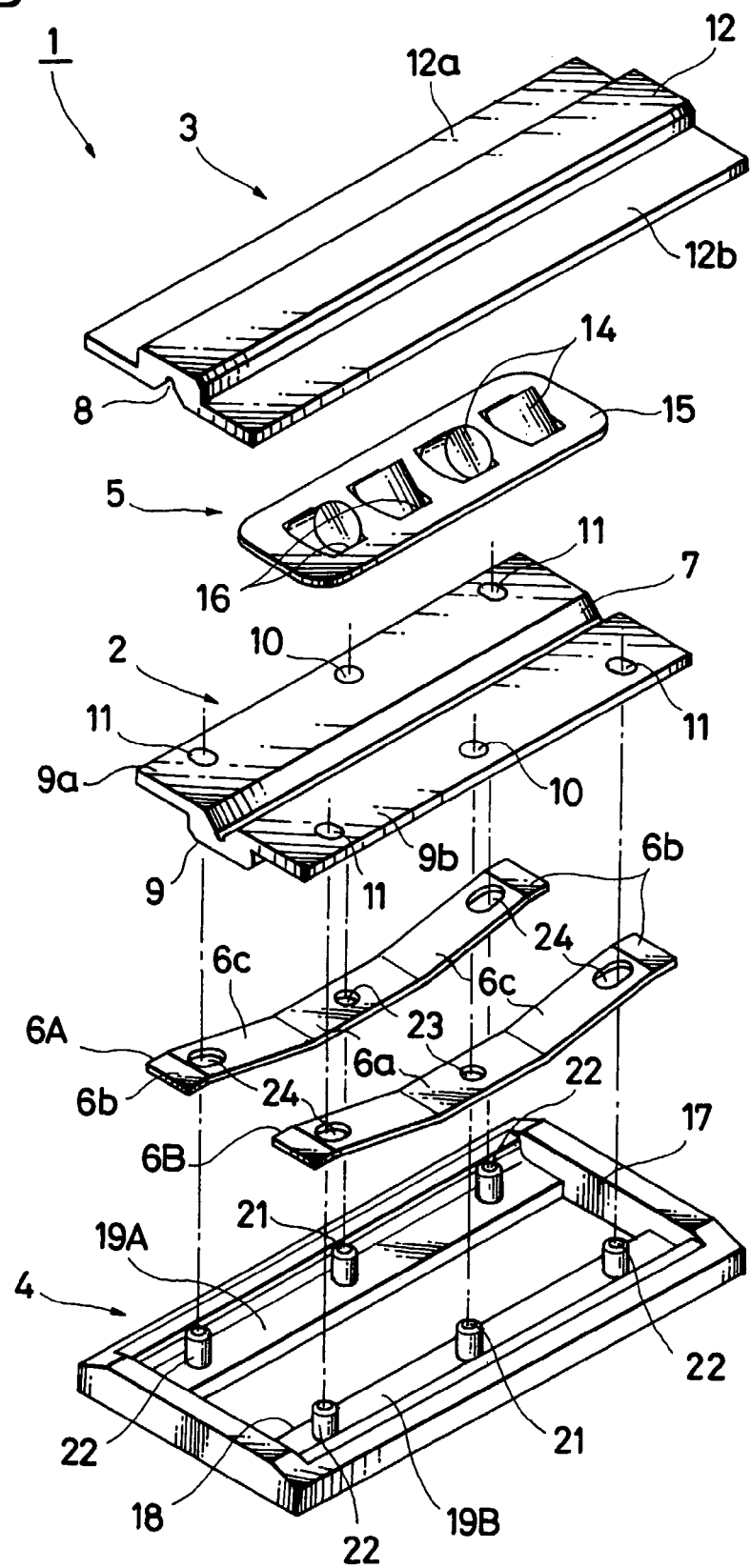
FIG. 3 is an exploded perspective view showing a first embodiment of a linearly movable rolling guide apparatus of a lens apparatus according to the present invention.

First, a linearly movable rolling guide apparatus for use with a lens apparatus according to the present invention will be described. FIG. 3 is an exploded perspective view showing a first embodiment of a linearly movable rolling guide apparatus according to the present invention. As shown in FIG. 3, a linearly movable rolling guide apparatus, generally depicted by reference numeral 1, is composed of a guide member 2 including a first guide groove 7, a movable member 3 including a second guide groove 8, a fixed member 4 for holding the guide member 2, a rolling element unit 5 interposed between the first and second guide grooves 7 and 8 so as to become able to roll freely and a pair of leaf springs 6A and 6B which show an embodiment of a pre-load member.

The guide member 2 is formed of a plate-like member which is rectangular in plane shape and which has a T-like cross-section in the direction perpendicular to its longitudinal direction. The guide member 2 has at its substantially central portion of the plane side the first guide groove 7 which is continuously extended from one end to the other end of the longitudinal direction. The first guide groove 7 has a V-like cross-section in the direction perpendicular to its longitudinal direction and it has at its bottom portion an escape groove to avoid it from contacting with a rolling element. Inclined surfaces at both sides of the guide groove 7 are set to substantially 45°, respectively. This guide member 2 has at its substantially central portion on the opposite surface of the surface with the first guide groove 7 formed thereon an elongated protrusion 9 which is continuously extended from one end to the other end in the longitudinal direction. Concave portions at both sides of this elongated protrusion are formed as overhang portions 9a and 9b.

Each of the overhand portions 9a and 9b has a positioning hole 10 and two engagement holes 11 and 11. In each of the overhand portions 9a and 9b, the positioning hole 10 is set at substantially the central portion in the longitudinal direction and the two engagement holes 11 and 11 are set to both sides of the longitudinal direction across the positioning hole 10 at substantially equal spacing therebetween. The two engagement holes 11 and 11 are oblong holes which are extended in the direction in which the first guide groove 7 is extended.

The movable member 3 has a shape substantially similar to that of the guide member 2 and it is formed of a plate-like member which is shaped like T. The movable member 3 has at its substantially central portion of the bottom surface side formed the second guide groove 8 which is continuously extended from one end to the other end in the longitudinal direction. The second guide groove 8 has an inverse-V-like cross-section in the direction perpendicular to its longitudinal direction and it has on its bottom surface formed an escape groove to avoid it from contacting with the rolling element. The inclined surfaces of both sides of the second guide groove 8 are set to approximately 45°, respectively. This movable member 3 has at its substantially central portion of the surface opposite to the surface in which the second guide groove 8 is formed provided the elongated protrusion 12 which is continuously extended from one end to the other end. The overhang portions 12a and 12b are set to both sides of this elongated protrusion 12.

While the dimension of the width direction of the movable member 3 is substantially the same as that of the width direction of the guide member 2, the dimension of the longitudinal direction of the movable member 3 is longer than that of the longitudinal direction of the guide member 2. The reason for this is that the guide member is fixed to the predetermined position while the movable member 3 may be moved relative to the guide member 2 in the direction in which the guide groove is extended. The first and second guide grooves 7 and 8 are set to be substantially the same in size.

The rolling element unit 5 is composed of a plurality of cylindrical rollers 14 (four cylindrical rollers 14 in this embodiment) which show a first embodiment of a rolling element and a holding device 15 to hold these cylindrical rollers 14 such that these cylindrical rollers 14 may become able to roll freely. While the cylindrical roller 14 is suitable for the application to the rolling element, it is possible to use other rolling elements such as a spherical roller and a ball. The holding device 15 has four holding holes 14 of the number same as that of the rolling elements to accommodate therein the cylindrical rollers 14. The four holding holes 16 of the holding device 15 are located on the same straight line and the four cylindrical rollers 14 are held in these holding holes 16 such that these four cylindrical rollers 14 may become able to freely roll in the state in which their inclination directions are changed alternately with an inclination of 45°.

The fixed member 4 is formed of a rectangular frame-like member having a concave portion 17 which is large enough to house therein the guide member 2. The fixed member 4 has at its substantially central portion of the width direction of the bottom surface an oblong hole 18 which is extended in the longitudinal direction 18. This oblong hole 18 has at its both sides of the width direction formed bottom surface portions 19A and 19B. Each of the bottom surface portions 19A and 19B includes a positioning pin 21 projected in the upper direction and two fitting pins 22 and 23 which are similarly projected in the upper direction.

The positioning pins 21 are set to substantially central portions of the respective bottom surface portions 19A and 19B in the longitudinal direction. Also, the two fitting pins 22 and 22 are located at both sides of the longitudinal direction across the positioning pin 21 with a predetermined gap therebetween. These positioning pin 21 and the fitting pins 22 and 22 correspond to the positioning hole 10 and the fitting holes 11 and 11 of the guide member 2 and thereby they may be engaged with each other upon assembly.

The pair of leaf springs 6A and 6B may be respectively attached to the left and right bottom surface portions 19A and 19B of the fixed member 4. The leaf springs 6A and 6B are made of long spring materials of sizes substantially the same as those of the bottom surface portions 19A and 19B and they have supporting portions 6a and 6a provided at central portions of the longitudinal directions. Further, pressure welding portions 6b and 6b are set to respective end portions of the longitudinal directions of the respective leaf springs 6A and 6B. Resilient portions 6c and 6c for applying spring-biasing force to the pressure welding portions 6b and 6b are set between the pressure welding portions 6b, 6b and the supporting portions 6a and 6a.

Positioning holes 23 formed of round holes are respectively bored at substantially central portions of the supporting portions 6a and 6a of the respective leaf springs 6A and 6B. The positioning pins 21 on the fixed member 4 are fitted into the respective positioning holes 23. The diameter of the positioning hole 23 is larger than the shaft diameter of the positioning pin 21. Thus, when the positioning hole 23 has a proper gap between it and the positioning pin 21, the positioning hole 23 can absorb accuracy error between the positioning pin 23 and the positioning pin 21. Escape holes 24 and 24 formed of oblong holes are respectively provided near the pressure welding portions 6b and 6b of the resilient portions 6c and 6c of the two leaf springs 6A and 6B. The fitting pins 22 and 22 on the fixed member 4 are respectively fitted into the respective escape holes 24 and 24. The escape holes 24 and 24 are formed as oblong holes extended in the longitudinal direction so as to allow the resilient portions 6c and 6c of the leaf springs 6A and 6B to be deformed with resiliency.

While engineering plastics such as ABS resin (acrylonitrile butadiene styrene resin) may be suitable as materials of the guide member 2, the movable member 3, the fixed member 4 and the holding device 15, the present invention is not limited thereto and it is also possible to use aluminum alloy and other metals. While metals such as spring steels may be suitable as a material of the leaf springs 6A and 6B, the present invention is not limited thereto and it is also possible to use engineering plastics such as ABS resin. Also, various materials such as stainless steel, structural carbon steel, cemented carbide and engineering plastics can be used as a material of the cylindrical rollers 14.

The linearly movable rolling guide apparatus 1 having the above-mentioned arrangement can be assembled with ease as follows. First, the pair of leaf springs 6A and 6B are respectively attached to the left and right bottom surface portions 19A and 19B of the fixed member 4. At that time, in the leaf springs 6A and 6B, the positioning pins 21 and 21 of the two bottom surface portions 19A and 19B are fitted into the positioning pins 23 and 23 of the supporting portions 6a and 6a and the fitting pins 22 and 22 are fitted into the fitting holes 11 and 11 at both sides. Next, the guide member 2 is inserted into the concave portion 17 of the fixed member 4 over the pair of leaf springs 6A and 6B. Then, the positioning pin 21 is fitted into the positioning hole 10 and the fitting pins 22 and 23 at both sides are respectively fitted into the fitting holes 11 and 11.

At that time, since the fitting hole 11 is formed as the oblong hole and its longitudinal direction is set to the direction in which it becomes perpendicular to the first guide groove 7, accuracy error of the fitting pin 22 relative to the positioning pin 21 can be absorbed by this oblong hole and the guide member 2 can be attached to the fixed member 4 with ease rapidly.

Next, the rolling element unit 5 which holds the four cylindrical rollers 14 thereon is fitted into the first guide groove 7 of the guide member 2. After that, the movable member 3 is placed on the guide member 2 and then the second guide groove 8 is fitted into the rolling element unit 5. Thus, the assembly work is completed and thereby the linearly movable rolling guide apparatus 1 can be obtained.

According to the linearly movable rolling guide apparatus 1 having the above-mentioned arrangement, the leaf springs 6A, 6B and the guide member 2 can be properly positioned by the positioning pin 21 and the engagement pin 22 of the fixed member 4. In addition, since the two leaf springs 6A and 6B are provided between the guide member 2 and the fixed member 4 so that the guide member 2 is spring-biased to the side of the movable member 3 under spring force of the leaf springs 6A and 6B, the predetermined pre-load, which is determined by spring force of the two leaf springs 6A and 6B, can be constantly applied to the rolling element unit 5. As a result, it becomes possible to decrease the inclinations of the rolling element unit 5 and the guide member 2 relative to the movable directions regardless of the position of the moving direction of the rolling element unit 5 and hence the linearly movable rolling guide apparatus 1 can be operated stably.

Although not shown, instead of the above-described leaf springs 6A and 6B, four coil springs, for example, can be used as the pre-load members. To be more concrete, the same four coil springs are attached to the four engagement pins 22 and 22 of the fixed member 4. Thus, it is possible to achieve actions and effects similar to those of the above-described leaf springs 6A and 6B. Also, the leaf springs 6A and 6B can be replaced with plate-like acrylic rubber, silicon rubber, urethane rubber and foam styrol and various kinds of rubberlike resilient materials. Instead of the engagement pins 22 and 22, it is possible to separately provide convex portions by which coil springs can be attached. Further, the four coil springs can be replaced with four leaf springs.

Figure 4:
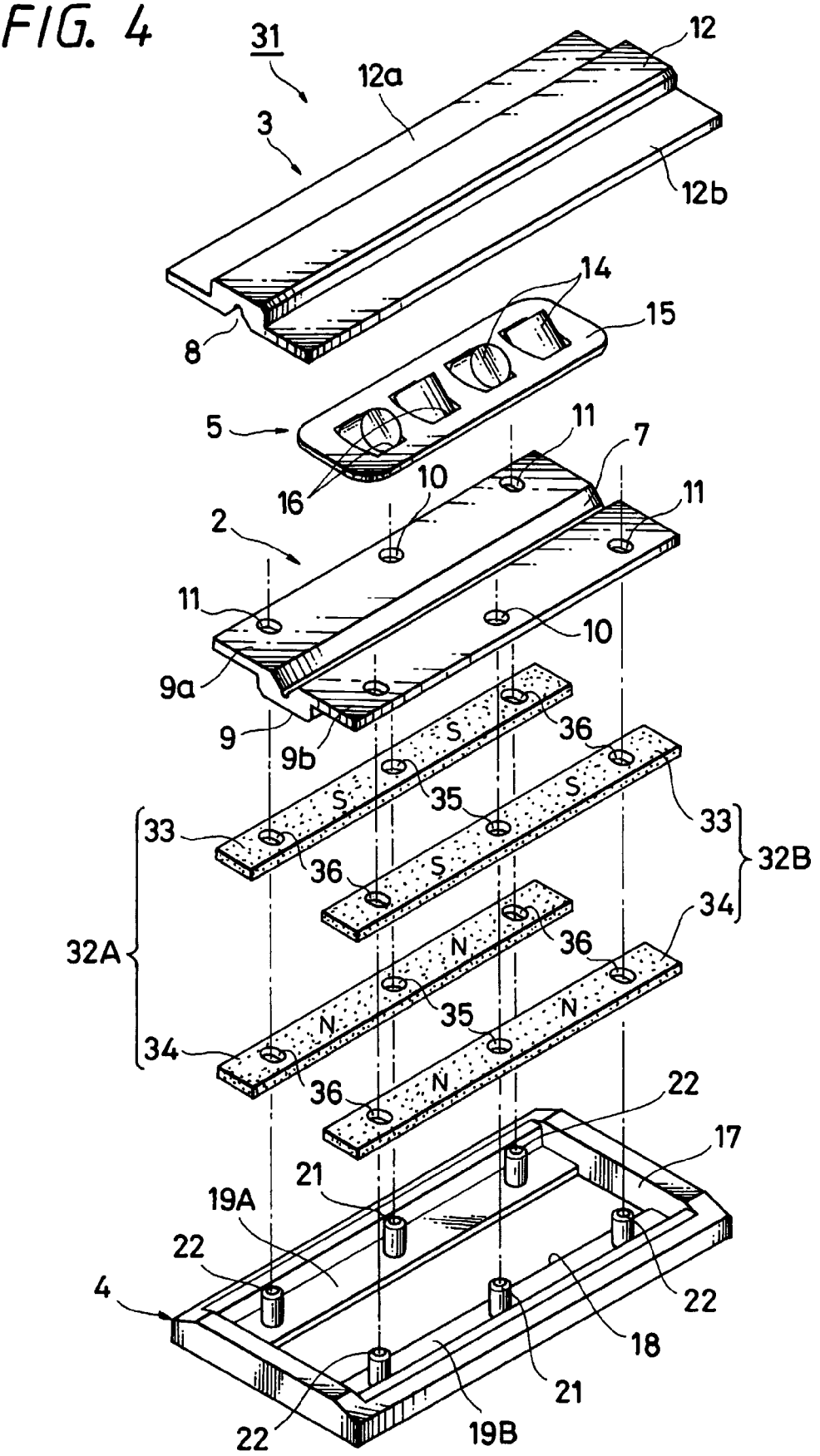
FIG. 4 is an exploded perspective view showing a second embodiment of a linearly movable rolling guide apparatus of a lens apparatus according to the present invention.

FIG. 4 is an exploded perspective view showing a second embodiment of a linearly movable rolling guide apparatus of the lens apparatus according to the present invention. As shown in FIG. 4, in a linear movable rolling guide apparatus 31 according to the second embodiment of the present invention, the pair of leaf springs 6A and 6B may be replaced with two sets of pair of permanent magnets, and two sets of plate-like permanent magnets 32A and 32B may constitute the second embodiment of the pre-load member. Since the second embodiment is different from the first embodiment only in the two sets of the plate-like permanent magnets 32A and 32B, the plate-like permanent magnets 32A and 32B will be described below. Therefore, other arrangements are denoted by identical reference numerals and therefore need not be described herein.

Specifically, as shown in FIG. 4, the linearly movable guide apparatus 31 is composed of the guide member 2 including the first guide groove 7, the movable member 3 including the second guide groove 8, the fixed member 4 for holding the guide member 2, the rolling element unit 5 provided between the first and second guide grooves 7 and 8 so as to roll freely and the two sets of the plate-like permanent magnets 32A and 32B which show the second embodiment of the pre-load member.

Each of the plate-like permanent magnets 32A and 32B is composed of first and second magnet plates 33 and 34. The first magnet plate 33 and the second magnet plate 34 are identical to each other. Accordingly, in this embodiment, the two sets of the plate-like permanent magnets 32A and 32B are constructed by using the four identical magnet plates 33 and 34. Each of the magnet plates 33 and 34 is formed of a long size magnet of the size substantially the same as those of the bottom surface portions 19A and 19B of the fixed member 4, wherein the N pole is set on the whole surface of its one surface side and the S pole is set on the whole surface of the other surface side.

Positioning holes 35 and 35 formed of round holes are formed at substantially the central portions of the longitudinal directions of the two magnet plates 33 and 34. The positioning pin 21 provided on the fixed member 4 is fitted into each positioning hole 35. The diameter of the positioning hole 35 is made larger than the shaft diameter of the positioning pin 21 similarly to the positioning hole 23 of the above-described embodiment. Thus, a gap of a proper size is set between the positioning hole 35 and the positioning pin 21, whereby errors in positional accuracy between the positioning pin 21 and the positioning hole 35 can be absorbed. Also, fitting holes 36 and 36 formed of oblong holes are provided on both end portions of the magnet plates 33 and 34. The engagement pins 22 and 22 provided on the fixed member 4 are respectively fitted into the fitting holes 36 and 36. This fitting hole 36 is formed as an oblong hole which is extended in the direction perpendicular to the direction in which the first guide groove 7 is extended, similarly to the fitting hold 11 of the guide member 2.

The linearly movable rolling guide apparatus 31 having the above-mentioned arrangement can be assembled with ease as follows, for example. First, the second magnet plates 34 and 34 are respectively attached to the left and right bottom surface portions 19A and 19B of the fixed member 4, for example. At that time, the second magnet plates 34 and 34 are attached to the left and right bottom surface portions 19A and 19B of the fixed member 4 in such a manner that their same poles (for example, N poles) are directed in the upper direction, the positioning pins 21 of the respective bottom surface portions 19A and 19B being fitted into the central positioning holes 35, the fitting pins 22 and 22 being fitted into the fitting holes 36 and 36 at both sides, respectively. At that time, although the second magnet plates 34 and 34 should preferably be fixed to the bottom surface portions 19A and 19A by using a fixing means such as an adhesive, when the second magnet plates 34 and 34 are respectively fixed to the bottom surface portions 19A and 19B by using repulsive force of the permanent magnet as seen in this embodiment, the second magnet plates 34 and 34 may be respectively fixed to the bottom surface portions 19A and 19B by using not the fixing means but by only fitting the positioning pins 21 into the positioning holes 35.

Next, the guide member 2 with the pair of the first magnet plates 33 and 33 fixed thereto is placed on the pair of the second magnet plates 34 and 34. At that time, the pair of the first magnet plates 33 and 33 are located with their N poles being opposed to each other such that they may be repulsed with each other from a relationship with the pair of the second magnet plates 34 and 34 (conversely, the pair of the first magnet plates 33 and 33 may be located with their S poles being opposed to each other). The pair of the first magnet plates 33 and 33 may be fixed to the left and right overhang portions 9a and 9b of the guide member 2 at both sides of the elongated protrusion 9 of the surface of the opposite side of the first guide groove 7, that is, the surface in which the elongated protrusion 9 exists.

At that time, the positioning holes 35 and 35 of the first magnet plate 33 are made coincident with the positioning holes 10 and 10 of the respective overhang portions 9a and 9b and the fitting holes 36 and 36 at both sides of the first magnet plate 33 are made coincident with the fitting holes 11 and 11 of the respective overhang portions 9a and 9b. The guide member 2 in which the pair of the first magnet plates 33 and 33 was formed as one body is inserted into the concave portion 17 of the fixed portion 4 from above the pair of the first magnet plates 33 and 33. Then, the positioning pin 21 is fitted into the positioning holes 35 and 10 and the fitting pins 22 and 22 are respectively fitted into the fitting holes 36 and 11.

In that case, since the fitting hole 36 and the fitting hole 11, which were made coincident with each other, are both formed as the oblong holes and their longitudinal directions are set to the direction perpendicular to the first guide groove 7, position accuracy error of the fitting pin 22 relative to the positioning pin 21 can be absorbed by the oblong holes and hence the attachment work of the guide member 2 can be carried out simply and rapidly.

After that, similarly to the above-described embodiment, the rolling element unit 5 that holds the four cylindrical rollers 14 is fitted into the first guide groove 7 of the guide member 2. Then, the movable member 3 is placed on the guide member 2 and the second guide groove 8 is fitted into the rolling element unit 5. Thus, the assembly work is completed and thereby the linearly movable rolling guide apparatus 31 is obtained. It is possible to use a magnetic member such as an electromagnet and an electromagnetic induction coil instead of the permanent magnet.

According to the linearly movable rolling guide apparatus 31 having the above-mentioned arrangement, the first magnet plates 33, 33 and the second magnet plates 34, 34, each of which forms the pair, are located in the two sets of the plate-like permanent magnets 32A and 32B provided between the fixed member 4 and the guide member 2 such that they are repulsed with each other, similarly to the above-described leaf springs 6A and 6B, it is possible to apply pre-load of a predetermined magnitude to the rolling element unit 5 by using repulsive force from the pair of the permanent magnets. Therefore, similarly to the above-described embodiment, the rolling element unit 5 can be avoided from being sunk, the pre-load applied to the rolling element unit 5 can be prevented from being changed considerably and smooth movement of the movable member 3 can be maintained.

Figure 5:
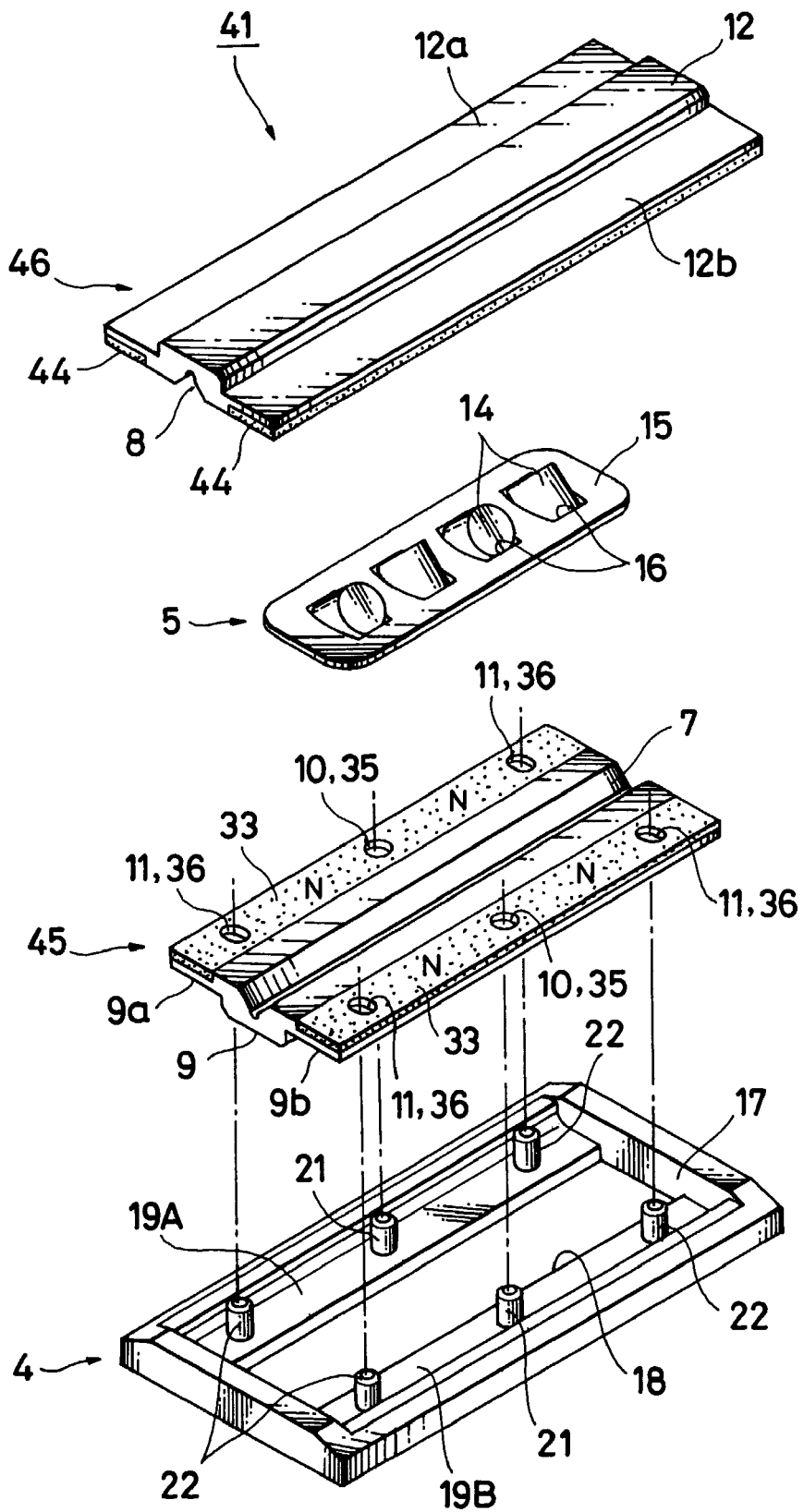
FIG. 5 is an exploded perspective view showing a third embodiment of a linearly movable rolling guide apparatus of a lens apparatus according to the present invention.

FIG. 5 is an exploded perspective view showing a third embodiment of a linearly movable rolling guide apparatus of a lens apparatus according to the present invention. As shown in FIG. 5, a linearly movable rolling guide apparatus 41 according to the third embodiment, the pair of the second magnet plates 34 and 34 constructing one element of the two sets of the plate-like permanent magnets 32A and 32B of the linearly movable rolling guide apparatus 31 in the second embodiment is fixed to the movable member 3.

The linearly movable rolling guide apparatus 41 of the third embodiment is different from the linearly movable rolling guide apparatus 31 of the second embodiment in that a pair of second magnet plates 44 and 44 is provided on a movable member 46 and that the shape of the guide member 45 is partly changed concurrently therewith. Therefore, the arrangements of the two sets of the plate-like permanent magnets 32A and 32B (each of which is composed of the first and second magnet plates 33 and 44), the guide member 45 and the movable member 46 will be described below. Other arrangements are denoted by identical reference numerals and therefore need not be described.

Specifically, the linearly movable rolling guide apparatus 41 is composed of the guide member 45 including the first guide groove 7, the movable member 46 including the second guide groove 8, the fixed member 4 to hold the guide member 45, the rolling element unit 5 provided between the first guide groove 7 and the second guide groove 8 so as to roll freely and the two sets of the plate-like permanent magnets 32A and 32B (first and second magnet plates 33 and 44) forming the pre-load member.

The shape of the guide member 45 is substantially similar to that of the guide member 2 in the above-described embodiment and it is different from that of the guide member 2 in that concave portions to house therein the first magnet plate 33 is provided on the side of the first guide groove 7 of the overhand portions 9a and 9b and that two first magnet plates 33 and 33 are attached to these concave portions, thereby being formed as one body. The two first magnet plates 33 and 33 may be fixed by using a suitable fixing means such as an adhesive. At that time, the positioning hole 35 of the first magnet plate 33 is made coincident with the positioning hole 10 of the overhang portion 9a (or 9b) and the fitting holes 36 and 36 at both sides are made coincident with the fitting hole 11 of the overhang portion 9a (or 9b).

The shape of the movable member 46 is substantially similar to that of the movable member 3 of the above-described embodiment and it is different from that of the movable member 3 in that concave portions to house therein the second magnet plate 44 are respectively provided on the side of the second guide groove 8 of the overhang portions 12a and 12b and that the two second magnet plates 44 are attached to these concave portions, thereby being formed as one body. In this case, the polarity of the first magnet plate 33 and that of the second magnet plate 44 may be set in such a manner that the first and second magnet plates 33 and 44 may be attracted with each other or that they may be repulsed with each other. The reason for this will be described below. That is, since the two sets of the plate-like permanent magnets 32A and 32B are located symmetrically across the first and second guide grooves 7 and 8, even when any one of the above-described polarity combinations is employed, balance can be kept in the right and left direction.

The linearly movable rolling guide apparatus 41 having the above-mentioned arrangement can be assembled more easily as follows, for example. First, the guide member 45 is attached to the fixed member 4. At that time, the pair of the positioning pins 21 and 21 of the fixed member 4 is fitted into the pair of the positioning holes 10 and 35 of the guide member 45 and the two pairs of the fitting pins 22 and 22 are fitted into the two pairs of the fitting holes 11 and 36. Next, the rolling element unit 5 which holds the four cylindrical rollers 14 is fitted into the first guide groove 7 of the guide member 45. After that, the movable member 46 is placed over the guide member 45 and the second guide groove 8 is fitted into the rolling element unit 5. As a result, the assembly work is completed and thereby the linearly movable rolling guide apparatus 41 can be obtained.

According to the linearly movable rolling guide apparatus 41 having the above-mentioned arrangement, since the first magnet plates 33 and the second magnet plates 44, each of which forms the pair, are located in the two sets of the plate-like permanent magnets 32A and 32B provided between the guide member 45 and the movable member 46 in such a manner that they may be attracted with each other or that they may be repulsed with each other, similarly to the case in which the above-described leaf springs 6A and 6B and the above-described magnet plates 33 and 34 are used, it is possible to apply pre-load of a proper magnitude to the rolling element unit 5 by using repulsive force or tensile force of the pair of the permanent magnets. Therefore, similarly to the above-described embodiments, the rolling element unit 5 can be avoided from being sunk, the pre-load applied to the rolling element unit 5 can be prevented from being changed considerably and smooth movement of the movable member 46 can be maintained.

Figure 1:
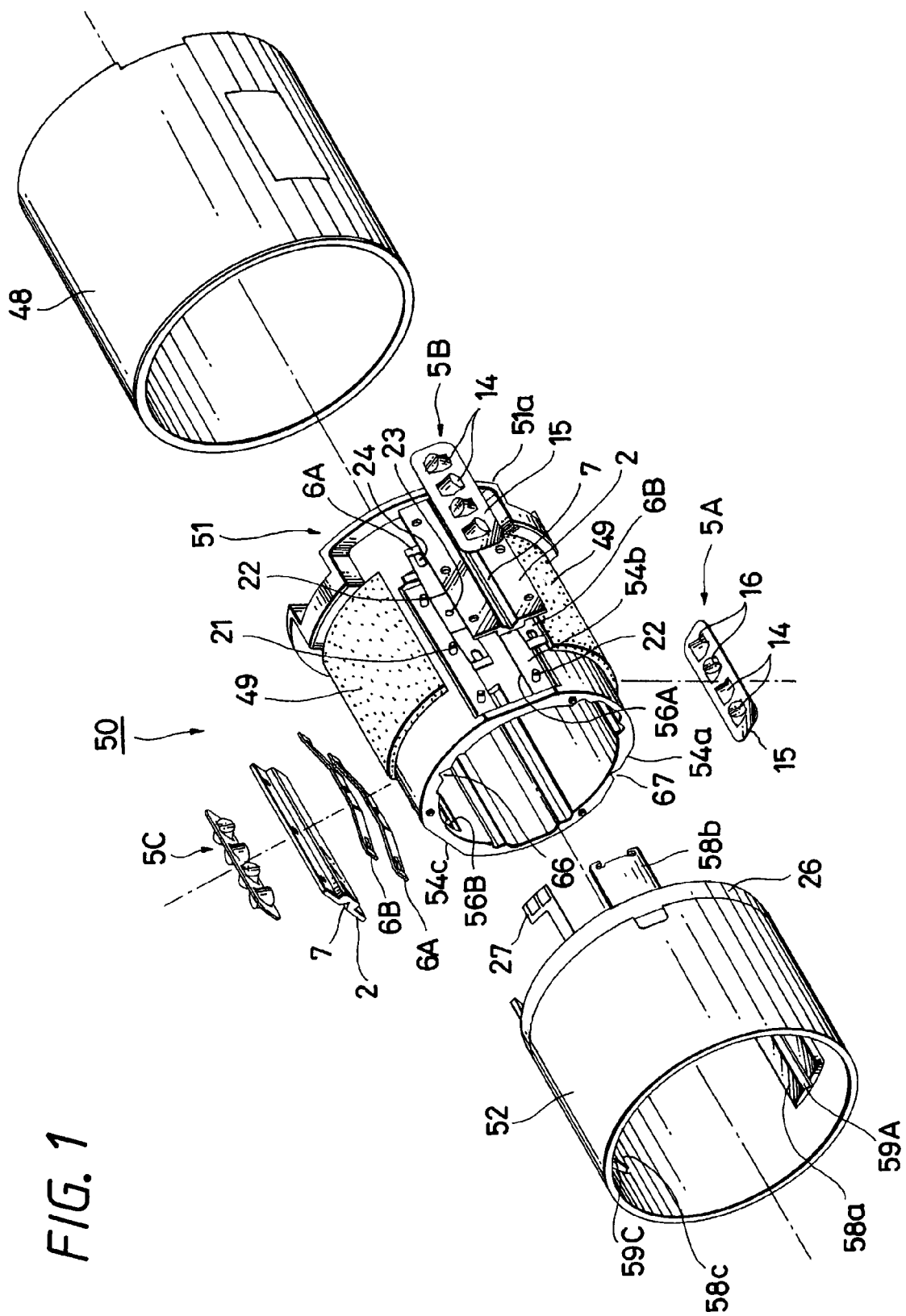
FIG. 1 is an exploded perspective view showing a lens barrel of a lens apparatus according to an embodiment of the present invention.

FIG. 1 is an exploded perspective view showing main assemblies of a lens lens-barrel 50 of a first embodiment of the lens apparatus according to the present invention. As shown in FIG. 1, the lens lens-barrel 50 is composed of a fixed lens-barrel 51, a movable lens-barrel 52 slidably held in this fixed lens-barrel 51, three rolling element units 5A, 5B and 5C provided between the fixed lens-barrel 51 and the movable lens-barrel 52, an exterior lens-barrel 48 serving as a yoke lens-barrel to act as a yoke, two sets of leaf springs 6A and 6B, two guide members 2 and 2 and the like.

The fixed lens-barrel 51 is formed of a circular cylinder and it has at its one end of the axial direction provided a flange portion 51a developed toward the outside of the radius direction. The fixed lens-barrel 51 has at its three places on the outer peripheral surface provided three flat surface portions 54a, 54b and 54c which are formed as flat surfaces within a predetermined range. The three flat surface portions 54a to 54c are located at an equal angular interval and an outer peripheral guide groove 67, which is a first guide groove, is provided on the first flat surface portion 54a. Also, opening portions 56A and 56B, each of which is rectangular in shape, are provided on the second and third flat surface portions 54b and 54c, respectively. The outer peripheral guide groove 67 is extended straight in parallel to the axial direction of the fixed lens-barrel 51. The cross-sectional shape of the outer peripheral guide groove 67 is shaped like V-letter and guide surfaces with inclinations of 45° are formed at both sides of the outer peripheral guide groove 67. One surface side of the first rolling element unit 5A is fitted into this outer peripheral guide groove 67.

The positioning pin 21 and the two fitting pins 22 and 22 are provided in series on the edge portions of both sides of the width direction (circumferential direction) of the two opening portions 56A and 56B of the fixed lens-barrel 51 at a predetermined interval in the axial direction. The pair of the leaf springs 6A and 6b may be respectively attached to the edge portions of the respective opening portions 56A and 56B by fitting the positioning hole 23 and the escape hole 24 into these pins 21 and 22. The guide member 2 is placed over the pair of these leaf springs 6A and 6B in the state in which the first guide grooves 7 are directed in the outside. One surfaces of the rolling element units 5B and 5C are respectively fitted into the first guide grooves 7 of the respective guide members 2, respectively. The three rolling element units 5A to 5C have similar shape and arrangement to those of the rolling element unit 5 that has been described so far in the above-described embodiments.

Further, three permanent magnets 49, 49 and 49 curved in a circular arc fashion are attached to the three curved surface portions among the three flat surface portions 54a, 54b and 54c in the outer peripheral surface of the fixed cylinder 51. The three permanent magnets 49, 49 and 49 are formed of plate-like magnets of the same shape and size and they are located at an equal interval in the circumferential direction of the fixed lens-barrel 51 (in a trisection fashion), whereafter they are integrally fixed to the fixed lens-barrel by a suitable fixing means such as an adhesive.

The movable lens-barrel 52 is formed of a circular cylindrical body with a diameter larger than that of the fixed lens-barrel 51. The fixed lens-barrel 51 is inserted into the inside of this movable lens-barrel 52 with a predetermined clearance. Protruded portions 58*a*, 58*b* and 58*c*, which are protruded in the inside of the radius direction, are provided on the three places of the inner peripheral surface of the movable lens-barrel 52. A part of the three protruded portions 58*a*, 58*b* and 58*c* is protruded from one end of the movable lens-barrel 52 to the outside of the axial direction. The three protruded portions 58*a*, 58*b* and 58*c* are located at an equal interval in the circumferential direction (that is, in a trisection fashion). Three second guide grooves 59A, 59B and 59C, which are continued in the axial direction, are provided on substantially the central portions of the respective inners surfaces of the three protruded portions 58*a*, 58*b* and 58*c*.

Figure 9:
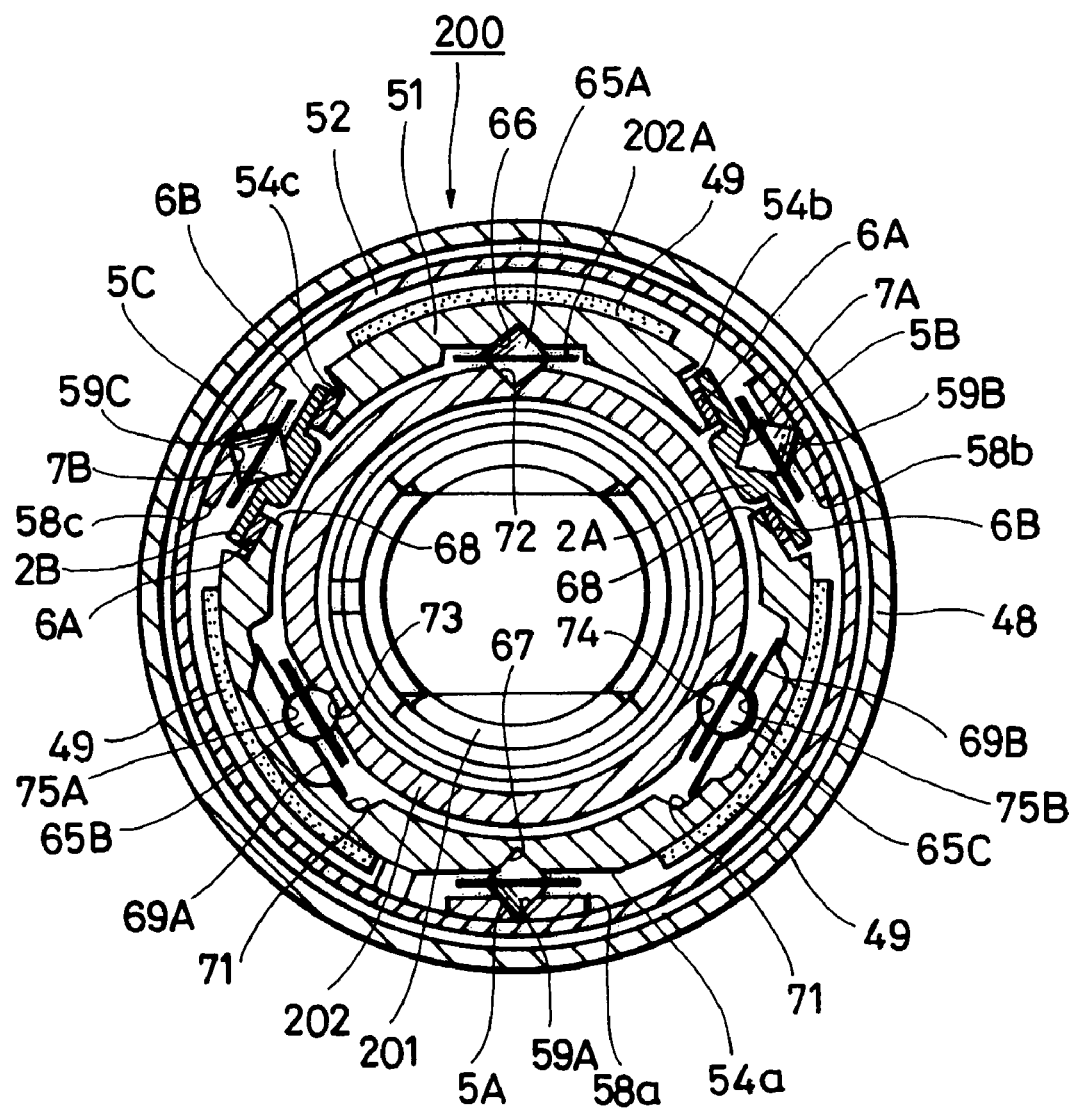
FIG. 9 is a cross-sectional view taken along the line X-X in FIG. 8.

As shown in FIG. 9, the three second guide grooves 59A, 59B and 59C are extended straight in parallel to the axial direction of the movable lens-barrel 52. Each of the three second guide grooves 59A, 59B and 59C has a V-like cross-section and guide surfaces with inclination angles of 45° are provided on both sides of the V-like cross-section. The other surface sides of the rolling element units 5A, 5B and 5C are fitted into the three second guide grooves 59A, 59B and 59C, respectively. Specifically, the three second guide grooves 59A, 59B and 59C are opposed to a fixed-side first guide groove 67 of the fixed lens-barrel 51 and the fixed-side first guide grooves 7A and 7B of the two guide members 2A and 2B attached to the fixed lens-barrel 51, and the three rolling element units 5A, 5B and 5C are provided among the inner and outer first guide grooves 67, 59A, 7A, 59B and 7B, 59C so as to roll freely.

Further, as shown in FIG. 1, a coil 26 is attached to the movable lens-barrel 52 in order to move the movable lens-barrel 52 forward and backward in the axial direction relative to the fixed lens-barrel 51. The coil 26 has a winding of a predetermined number so as to have diameters (both of an inner diameter and an outer diameter) substantially similar to that of the movable lens-barrel 52. Also, the coil 26 is fitted into the three protruded portions 58*a*, 58*b* and 58*c* and thereby integrally fixed to one end portion of the movable lens-barrel 52 as one body. A wiring plate 27 for supply power is connected to the coil 26. Then, an exterior lens-barrel 48 formed of a cylindrical body is attached to the outside of the movable lens-barrel 52 with a predetermined gap. Also, the exterior lens-barrel 48 is engaged with the flange portion 51*a* of the fixed lens-barrel 51 at one end of the axial direction and thereby properly positioned.

Magnetic materials with high magnetic permeability, such as pure iron and Permalloy (Ni—Fe alloy) are suitable as the application to the materials of the fixed lens-barrel 51 and the exterior lens-barrel 48. However, the material of the fixed lens-barrel 51 is not limited to the above-mentioned materials and the fixed lens-barrel 51 may be made in such a manner that the whole of the fixed lens-barrel 51 may be formed of a resin cylindrical body, the magnetic material with high magnetic permeability being provided at necessary portions of the resin cylindrical body. In this case, the first guide groove 67 that should be provided on the fixed lens-barrel 51 and portions that should be requested to have high dimensional accuracy and plane accuracy can be formed as resin mold products. Further, the first guide groove 67 and the above-mentioned portions can be formed as die-cast mold products using a suitable material such as aluminum alloy and magnesium alloy or they can be formed as composite material products molded by a die-cast mold product and a resin. When the fixed lens-barrel 51 is formed as the resin mold product and the like as described above, higher productivity can be expected.

Also, the movable lens-barrel 52 may be not only formed as a resin mold product but also it can be formed as a die-cast mold product using a suitable material such as aluminum alloy and magnesium alloy or it can be formed as a composite material product molded by a die-cast mold product and a resin in the same way as the fixed lens-barrel 51.

The aforementioned coil 26, three permanent magnets 49, 49 and 49 and the fixed lens-barrel 51 and the exterior lens-barrel 48 constitute a linear motor drive means. In this case, the fixed lens-barrel 51 is constructed as a ground-side yoke in which the permanent magnets 49, 49 and 49 are disposed and the exterior lens-barrel 48 is constructed as an opposing-side yoke which receives magnetic flux from the ground-side yoke. As a consequence, since the movable lens-barrel 52 to which the coil 26 is fixed exists in constant magnetic flux, it becomes possible to drive the linear motor drive means with application of a voltage to connection terminals of the wiring plate 27 connected to the coil 26.

In this case, since the movable lens-barrel 52 is supported to the fixed lens-barrel 51 through the three rolling element units 5A, 5B and 5C so as to become freely slidable and it is also applied with the pre-load under spring force of the two sets of the leaf springs 6A and 6B, the whole of the supporting portion can be prevented from being wobbled. Further, the movable lens-barrel 52 can be moved in the optical axis direction without displacement relative to the optical axis of the lens and hence it becomes possible to stably move the movable lens-barrel 52 in the optical axis direction with high accuracy. Also, since the three permanent magnets 49, 49 and 49 occupy the whole surface other than the portion in which the three rolling element units 5A, 5B and 5C are provided, the area occupied by the three permanent magnets 49, 49 and 49 can be increased as large as possible. Further, since the coil 26 exists on the circumference with a constant gap relative to the three permanent magnets 49, 49 and 49, efficiency of the magnetic circuit can be demonstrated at the maximum.

Figure 2:
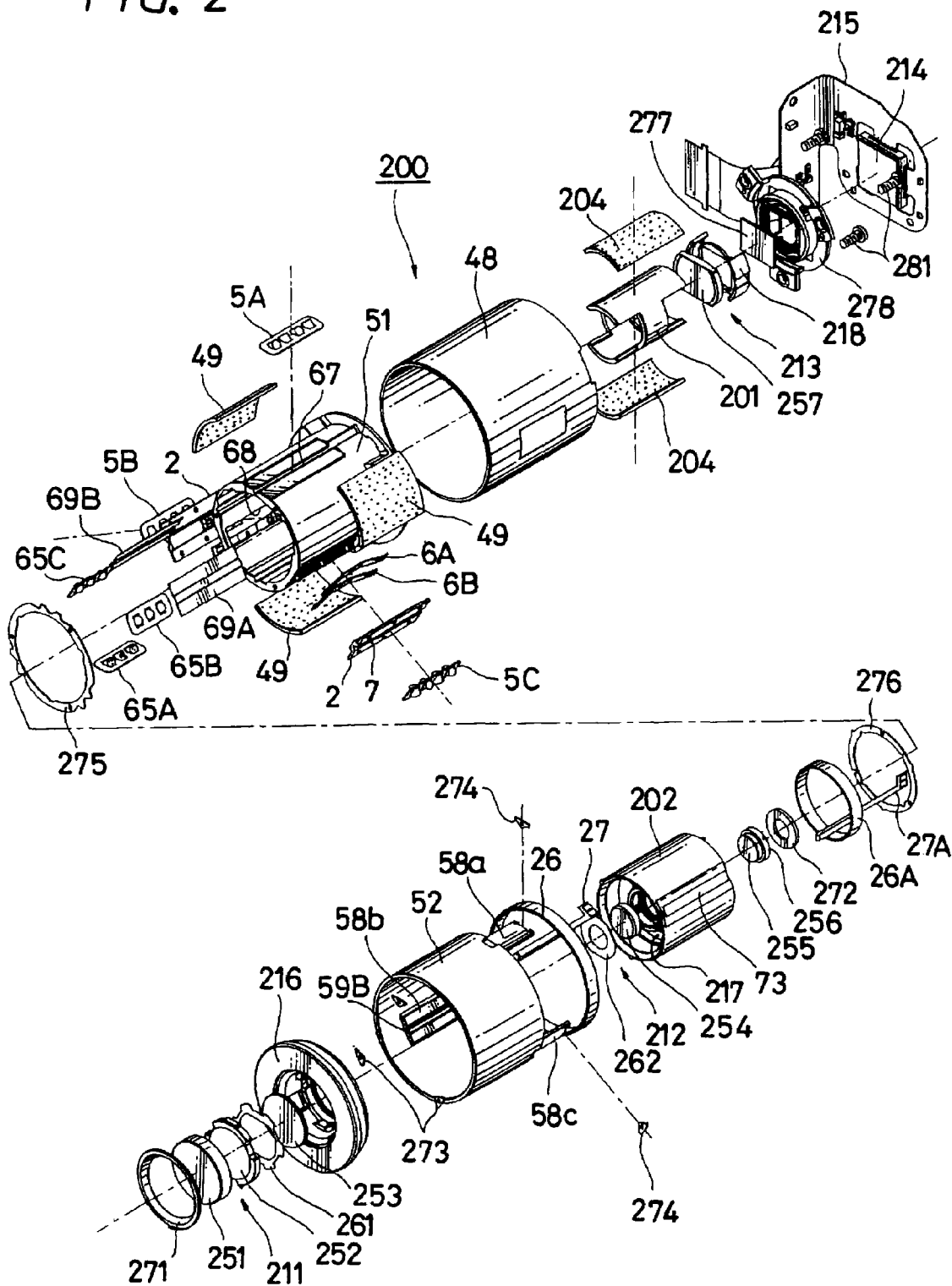
FIG. 2 is an exploded perspective view showing an overall arrangement of the first embodiment of the lens apparatus according to the present invention.
Figure 6:
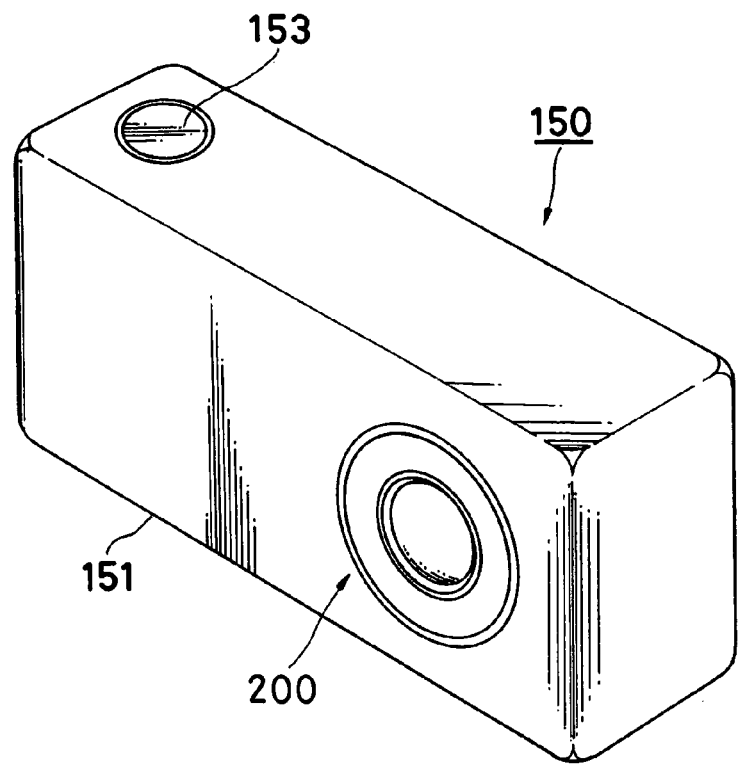
FIG. 6 is a perspective view showing an image pickup apparatus including a lens apparatus according to an embodiment of the present invention.
Figure 7:
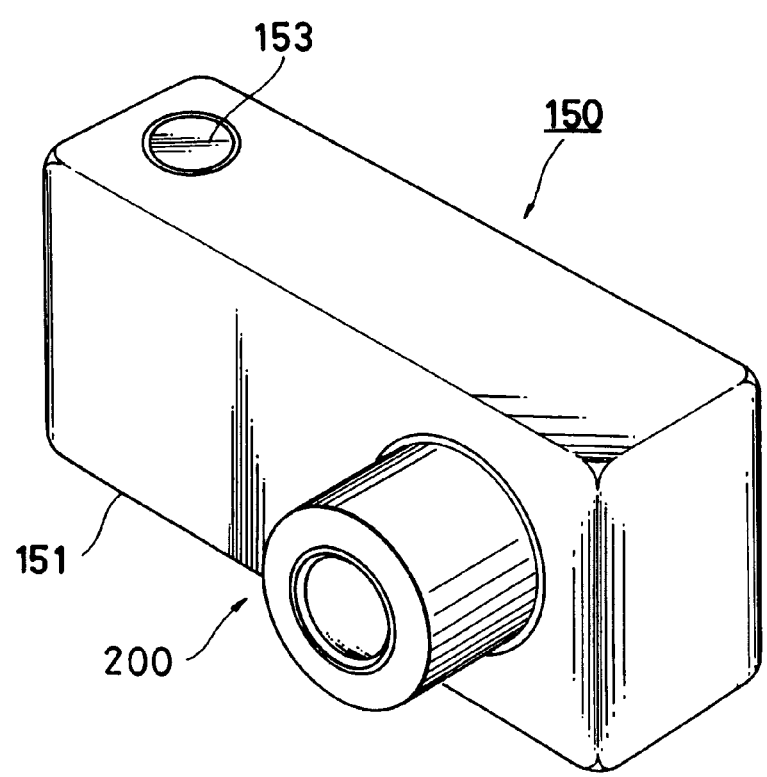
FIG. 7 is a perspective view showing the state in which a movable lens barrel of a lens apparatus is extended from the state of the image pickup apparatus shown in FIG. 6.
Figure 8:
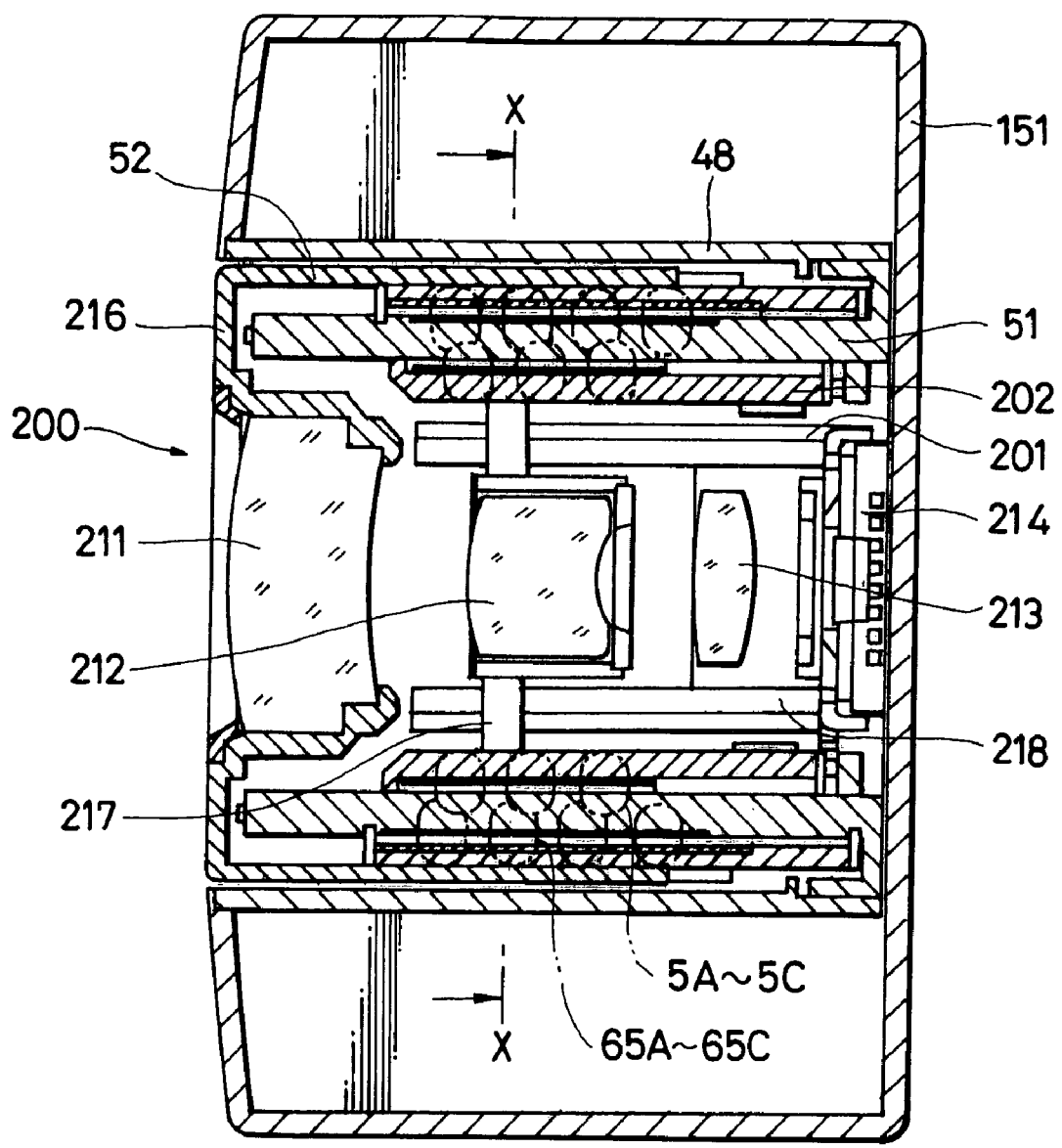
FIG. 8 is a longitudinal cross-sectional view showing the state in which the image pickup apparatus shown in FIG. 6 is cut away along the lens apparatus portion.
Figure 10A:
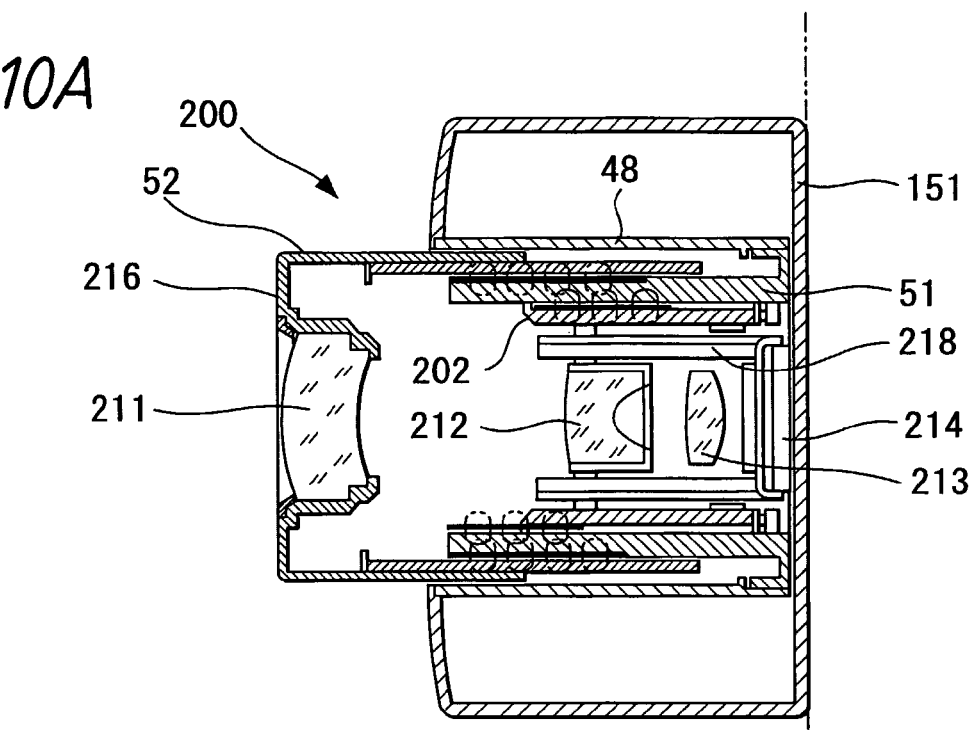
Figure 10B:
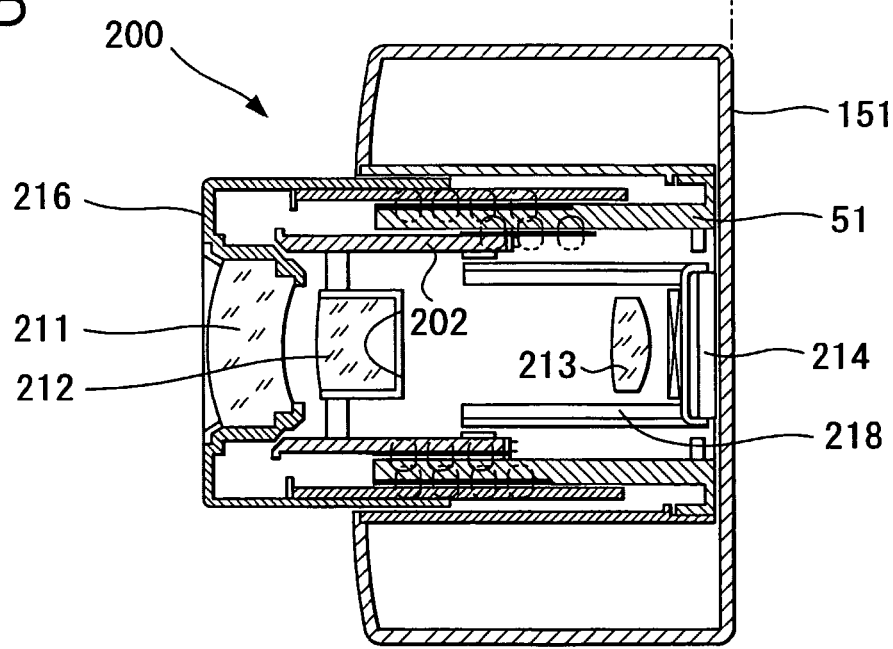

FIG. 2 is an exploded perspective view showing all assemblies of a lens apparatus 200 containing the lens lens-barrel 50 shown in FIG. 1. This lens apparatus 200 is formed of an optical system having a three lens group arrangement which is roughly composed of three lens groups. FIGS. 6 and 7 are perspective view showing an outward appearance of an electronic still camera 150 which shows an embodiment of an image pickup apparatus incorporating therein the lens apparatus 200 shown in FIG. 2. FIG. 8 is a longitudinal cross-sectional view of the portion of the lens apparatus 200 of the electronic still camera 150, FIG. 9 is a cross-sectional view taken along the line X-X in FIG. 8 and FIGS. 10A and 10B are schematic cross-sectional views to which reference will be made in explaining the state in which the movable lens-barrel 52 of the lens apparatus 200 is extended, respectively.

As shown in FIG. 2, the lens apparatus 200 is composed of the exterior lens-barrel 48, the first fixed lens-barrel 51, a second fixed lens-barrel 201, the first movable lens-barrel 52, a second movable lens-barrel 202, a one-group lens 211, a two-group lens 212, a three-group lens 213, a CCD (charge-coupled device) 214, that is, a solid-state image pickup device which shows a specific example of the image pickup means and the like.

The three first permanent magnets 49, 49 and 49 are located on the outer peripheral surface of the first fixed lens-barrel 51 at the equal interval and fixed thereto by a suitable fixing means such as an adhesive as mentioned hereinbefore. Also, two second permanent magnets 204 and 204 are located on the outer peripheral surface of the second fixed lens-barrel 201 at an equal interval and fixed thereto by a suitable fixing means such as an adhesive. The first fixed lens-barrel 51 and the second fixed lens-barrel 201 are fixed to a camera body (image pickup apparatus body) 151 of the electronic still camera 150 at their back sides.

The three permanent magnets 49, 49 and 49 are formed as plate bodies curved in circular arc-fashion and they are closely fixed to the positions of 120° each (at an equal angular distance) which results from equally dividing the outer peripheral surface of the first fixed lens-barrel 51. The first rolling element units 5A, 5B and 5C are located among these three permanent magnets 49, 49 and 49. One surface of the first rolling element unit 5A of the first rolling element unit is brought in contact with the fixed-side first guide groove 67 which is the outer peripheral guide groove of the first fixed lens-barrel 51 and one surfaces of the first rolling element units 5B and 5C of the second and third rolling element units are brought in contact with the guide grooves 75A and 75B of the two guide members 2A and 2B attached to the two opening portions 56A and 56B of the first fixed lens-barrel 51. Then, the pair of the leaf springs 6A and 6A may be provided between the two guide members 2A and 2B and the first fixed lens-barrel 51.

The one-group lens 211 is held at the central hole of the one-group lens holding frame 216 of the annular shape. This one-group lens 211 is constructed by a combination of a first lens (G01 lens) 251, a second lens (G02 lens) 252, a third lens (G03 lens) 253 and a first mask (G01 mask) 261, it can be prevented from being released from the central hole of the one-group lens holding frame 216 by a decoration ring 271 and then it is attached to the one-group lens holding frame 216. The one-group lens holding frame 216 is fixed to the front-side end face portion of the first movable lens-barrel 52 and thereby formed as one body with the first movable lens-barrel 52.

The one-group coil 26 having a circular winding and whose diameter (outer diameter and inner diameter) is substantially the same as that of the first movable lens-barrel 52 is fixed to the rear-side end face portion of the first movable lens-barrel 52 in such a manner that it may be fitted into respective outer peripheries of the three protruded portions 58a, 58b and 58c. The one-group coil 26 is used to drive the first movable lens-barrel 52 by the linear motor and it is electrically connected to the one-group wiring plate 27 for supplying electric power. This first movable lens-barrel 52 is fitted into the outside of the first fixed lens-barrel 51 with a predetermined gap and the three movable-side first guide grooves 59A, 59B and 59C are opposed to the fixed-side first guide groove 67 of the first fixed lens-barrel 51 and the fixed-side first guide grooves 7A and 7B of the guide members 2A and 2B attached to the two opening portions 68 and 68. Then, the three first rolling element units 5A, 5B and 5C are located between the fixed-side first guide grooves 67, 7A and 7B and the movable-side first guide grooves 59A, 59B and 59C which form the pairs at the three portions.

The two-group lens 212 is held on the two-group lens holding frame 217 which is unitarily formed as one body with the second movable lens-barrel 202 having the cylindrical shape. This two-group lens 212 is composed of a combination of a fourth lens (G04 lens) 254 and a second mask (G02 mask) 262 held on the front side of the two-group lens holding frame 217 and a fifth lens (G05 lens) 255, a sixth lens (G06 lens) 256 and a fixed stop 272 held on the rear side of the two-group lens holding frame 217. This two-group lens 212 is thus unitarily fitted into and fixed to the two-group lens holding frame 217. The fixed stop 272 can be replaced with other suitable means such as an iris unit and a shutter unit.

Three movable-side guide grooves 72, 73 and 74 are formed on the outer peripheral surface of the second movable lens-barrel 202. Those movable-side second guide grooves 72, 73 and 74 are opposed to the fixed-side second guide groove 66 and the fixed-side second guide grooves 75A and 75B of the two guide plates 69A and 69B in the state in which they are inserted into the inside of the first fixed lens-barrel 51. Then, the three second rolling element units 65A, 65B and 65C are located between the fixed-side second guide grooves 66, 75A and 75B and the movable-side second guide grooves 72, 73 and 74 which form the pairs at the three portions.

A two-group coil 26A having a circular winding of which diameter (outer diameter and inner diameter) is substantially the same as that of the second movable lens-barrel 202 is fixed to the rear side end face portion of the second movable lens-barrel 202. The two-group coil 26A is used to drive the second movable lens-barrel 202 by the linear motor and it is electrically connected to a two-group wiring plate 27A for supplying electric power. The second fixed lens-barrel 201 is inserted into the inside of the second movable lens-barrel 202 with a predetermined gap.

As shown in FIG. 2, while a plurality of rolling elements may be held by the plate-like holding device at a predetermined interval in the first and second rolling element units 5A, 5B and 5C and 65A, 65B and 65C, a plurality of click-like cage stoppers 273 and 274 and a plurality of ring-like stopper rings 275 and 276 are used in order to prevent the holding device 15 from being displaced or dropped.

The first cage stopper 273 is fixed to the front side rear end face portion of the first movable lens-barrel 52 and the second cage stopper 274 is fixed to the rear side end face portion of the first movable lens-barrel 52. Also, the first stopper ring 275 is fixed to the front side rear end face portion of the opposite side of the flange portion 51a of the first fixed lens-barrel 51 and the second stopper ring 276 is fixed to the rear side end face portion of the second movable lens-barrel 202.

Also, a three-group lens 213 is formed of a seventh lens and it is held by a three-group lens holding frame 218 including holding portions located in the right and left direction. Through this three-group lens holding frame 218, the three-group lens 213 is fixed to the rear portion of the second fixed lens-barrel 201. A rear lens-barrel 278 with an optical filter 277 fixed thereto is located at the rear side of the second fixed lens-barrel 201. A CCD (charge-coupled device) 214, that is, a solid-state image pickup device serving as an image pickup means is fixed to the back surface of this rear lens-barrel 278 by other suitable fixing means such as an adhesive.

The three group lenses 211, 212 and 213 are located in such a manner that their optical axes are made coincident with the same axis. The CCD 214 is located on such optical axis behind the three-group lens 213. A wiring plate 215 is attached to the back surface of the CCD 214 and the CCD 214 is mounted on a predetermined wiring circuit of the wiring plate 215. Then, the exterior lens-barrel 48 is properly positioned by the outermost diameter portion and rear side surface of the first fixed lens-barrel 51 and it is fastened and fixed through the rear lens-barrel 278 by three fixed screws 281, 281 and 281.

Specifically, the first movable lens-barrel 52 is fitted into the first fixed lens-barrel 51 with a predetermined gap in the outside of the radius direction and the exterior lens-barrel 48 is fitted into the first movable lens-barrel 52 with a predetermined gap in the outside of the radius direction. Then, the three sets of the first rolling element units 5A, 5B and 5C are located between the first movable lens-barrel 52 and the first fixed lens-barrel 51. Also, the second movable lens-barrel 202 is located in the inside of the radius direction of the first fixed lens-barrel 51 with a predetermined gap in the inside of the radius direction, and the second fixed lens-barrel 201 is fitted into the second movable lens-barrel 202 with a predetermined gap in the inside of the radius direction. Then, the three sets of the second rolling element units 65A, 65B and 65C are located between the first fixed lens-barrel 51 and the second movable lens-barrel 202.

The three sets of the first rolling element units 5A, 5B and 5C and the three sets of the second rolling element units 65A, 65B and 65C are located at substantially an equal angular distance (120°) in the circumferential direction, respectively. Then, the first rolling element units 5A, 5B and 5C and the second rolling element units 65A, 65B and 65C are located at the positions deviated 60° from each other.

In order to realize the above-mentioned arrangement, as shown in FIGS. 8 and 9, the first fixed lens-barrel 51 is provided with the fixed-side first and second guide grooves 66 and 67 continued in the axial direction, the two opening portions 68 and 68 to hold the two guide members 2A and 2B and two dented portions 71 and 71 to hold the two guide members 69A and 69B.

The fixed-side second guide groove 66 is formed on the inner peripheral surface of the first fixed lens-barrel 51 and the fixed-side first guide groove 67 is formed on the outer peripheral surface of the first fixed lens-barrel 51. The fixed-side second guide groove 66 and the fixed-side first guide groove 67 are set to the positions which are deviated 180° from each other. The fixed-side first guide groove 67 is assumed to be a first reference portion by which the relative position between the first fixed lens-barrel 51 and the first movable lens-barrel 52 can be determined. The fixed-side second guide groove 66 is assumed to be a second reference portion by which the relative position between the first fixed lens-barrel 51 and the second movable lens-barrel 202 can be determined.

Also, in the first fixed lens-barrel 51, the two dented portions 71 and 71 are set on the inner peripheral surfaces of the positions deviated 60° each to the respective sides around the fixed-side first guide groove 67. Further, the two opening portions 68 and 68 are formed on the outer peripheral surfaces of the positions deviated 60° each to the respective sides. In response to the first fixed lens-barrel 51, the three movable-side second guide grooves 72, 73 and 74 continued in the axial direction are provided at three portions of the outer peripheral surface of the second movable lens-barrel 202. While the three movable-side second guide groove 72, 73 and 74 are located at an equal interval in the circumferential direction and the movable-side second guide groove 72 has a V-like cross-section, other two movable-side second guide grooves 73 and 74 have semi-circular cross-sections.

The movable-side second guide groove 72 is opposed to the fixed-side second guide groove 66 of the first fixed lens-barrel 51, and the second rolling element unit 65A is provided between the fixed-side second guide groove 66 and the movable-side second guide groove 72 so as to roll freely. Also, the movable-side second guide grooves 73 and 74 are opposed to the two dented portions 71 and 71 of the first fixed lens-barrel 51 and the two second rolling element units 65B and 65C are separately provided between the fixed-side second guide grooves 75A and 75B of the two guide plates 69A and 69B held to these dented portions 71 and 71.

While the two of the second rolling element units 65B and 65C are formed as spheres in this embodiment, they may be formed like cylindrical rollers as rolling elements similarly to other rolling element unit 65A. Also, all rolling elements can be formed as spheres. Further, the rolling elements are not limited to the cylindrical rollers and the spheres shown in this embodiment. By way of example, the rolling elements can be formed as not only spherical rollers (barrel-like rollers) but also as other suitable shapes. That is, rolling elements of any shapes can be combined for use as the application to the above-mentioned rolling elements so long as the rolling elements of such shapes can be used as the above rolling elements.

Also, in response to the first fixed lens-barrel 51, the protruded portions 63, which are protruded toward the inside of the radius direction, are provided at the three portions of the inner peripheral surface of the first movable lens-barrel 52. The three movable-side first guide grooves 59A, 59B and 59C continued in the axial direction are formed on the inner surface of the three protruded portions 63, 63 and 63. The three movable-side first guide grooves 59A, 59B and 59C are located at an equal interval on the circumferential direction and they have V-like cross-sections. The movable-side first guide groove 59A is opposed to the fixed-side first guide groove 67 of the first fixed lens-barrel 51, and the first rolling element unit 53A is provided between the movable-side first guide groove 59A and the fixed-side first guide groove 67 such that it can be rolled freely.

The two movable-side first guide grooves 59B and 59C are opposed to the two opening portions 68 and 68 of the first fixed lens-barrel 51, and the two first rolling element units 5B and 5C are provided between the two guide members 2A and 2B held to these opening portions 68 and 68 in such a manner that they can be rolled freely. Further, the pair of the leaf springs 6A and 6B serving as the pre-load members is provided between the two guide members 2A and 2B and the supporting portion that is the edge portion of the opening portion 68 of the first fixed lens-barrel 51 which supports the two guide members 2A and 2B. The two sets of the leaf springs 6A and 6B spring-bias the two guide members 2A and 2B to the outside of the radius direction, whereby pre-load of substantially a uniform predetermined magnitude can be applied to totally six rolling element units 5A, 5B, 5C and 65A, 65B and 65C of the three first rolling element units 5A, 5B, 5C and the three second rolling element units 65A, 65B and 65C.

According to the above-mentioned arrangement, substantially uniform pre-load can be applied to the six rolling element units 5A, 5B, 5C and 65A, 65B and 65C located at the six portions by spring force of the leaf springs 6A and 6B which may act from the two directions. Therefore, even when the rolling element units 5A, 5B, 5C and 65A, 65B and 65C are located at any positions in the moving direction, these rolling element units 5A, 5B, 5C and 65A, 65B and 65C can be prevented from being sunk, the pre-load applied to the rolling element units 5A, 5B, 5C and 65A, 65B, 65C can be prevented from being changed considerably and hence it is possible to smoothly move the first movable lens-barrel 52 and the second movable lens-barrel 202 with high accuracy.

Specifically, according to this embodiment, the first movable lens-barrel 52 is supported to the first fixed lens-barrel 51 at the three portions in the circumferential direction by the rolling element units 5A, 5B and 5C such that they can be rolled freely. In addition, the second movable lens-barrel 202 also is supported to the first fixed lens-barrel 51 at the three portions of the circumferential direction by the rolling element units 65A, 65B and 65C such that they can be rolled freely. Then, of the three first rolling element units 5A, 5B and 5C, the guide members 2A and 2B and the leaf springs 6A and 6B serving as the pre-load members are respectively located at the two portions and the two guide members 2A and 2B are spring-biased toward the two rolling element units 5B and 5C under spring force of the leaf springs 6A and 6B.

As a consequence, the first movable lens-barrel 52 can be properly positioned to the first fixed lens-barrel 51 by the first rolling element unit 5A located at one portion, and the second movable lens-barrel 202 can be properly positioned to the first fixed lens-barrel 51 by the second rolling element unit 65A located at one portion. Then, since spring force is applied to the two first rolling element units 5B and 5C by the guide members 2A and 2B and the leaf springs 6A and 6B between the first fixed lens-barrel 51 and the first movable lens-barrel 52, the pre-load of substantially equal magnitude can be applied to all of the six rolling element units 5A, 5B, 5C and 65A, 65B and 65C including these two first rolling element units 5B and 5C and hence pressure of the whole of the structure body can be well balanced.

Specifically, under spring force of the leaf springs 6A and 6B which act from the two directions, the substantially equal pre-load can be applied to the six rolling element units 5A, 5B, 5C and 65A, 65B and 65C located at the six portions. Therefore, even when the rolling element units 5A, 5B, 5C and 65A, 65B and 65C are located at any positions in the moving direction, the rolling element units 5A, 5B, 5C and 65A, 65B and 65C can be prevented from being sunk, the pre-load applied to the rolling element units 5A, 5B, 5C and 65A, 65B and 65C can be prevented from being changed considerably and hence it is possible to smoothly move both of the first movable lens-barrel 52 and the second movable lens-barrel 202 with high accuracy separately.

The shapes of the fixed lens-barrels 51 and 201 and the movable lens-barrels 52 and 202 are not limited to the cylindrical shapes which have been described so far in the aforementioned embodiments and it is needless to say that square cylinders, oval cylinders and cylinders of various shapes can be used as the shapes of the fixed lens-barrels 51 and 201 and the movable lens-barrels 52 and 202. Also, the number of the supporting portions is not limited to the three-point supporting or the six-point supporting in the above-described embodiments and the supporting portions for supporting at least three points may be provided. Furthermore, it is needless to say that there may be provided the supporting portions of more than four supporting points.

FIGS. 6 and 7 are perspective views showing an electronic still camera 150 which shows a specific example of an image pickup apparatus using the lens apparatus 200 having the aforementioned arrangement. The electronic still camera 150 shown in FIGS. 6 and 7 includes a camera body 151 which shows a specific example of an image pickup apparatus body. The camera body 151 has the collapsible type lens apparatus 200 incorporated therein.

The camera body 151 is formed of an oblong housing having a space formed in its inside, and the lens apparatus 200 is located on one side (right-hand side toward the camera in this embodiment) of the lateral direction which is the longitudinal direction of the camera body 151. Although not shown, a printed circuit board on which various kinds of electronic assemblies are mounted, a battery power supply, various kinds of electronic assemblies and mechanical assemblies, apparatus and the like are accommodated within the inside space of the camera body 151.

A shutter release button 153 for taking a picture of an object is provided on the upper surface of the camera body 151. Further, although not shown, a power supply button, a mode selection dial, a flat surface display panel formed of a liquid-crystal display (LCD) to display various modes selected by the mode selection dial, objects and the like, an electronic viewfinder and the like are provided on the camera body 151. FIG. 6 shows the state in which the collapsible type lens apparatus 200 is collapsed and housed within the camera body 151. FIG. 7 shows the state in which the collapsible type lens apparatus 200 is extended from the camera body 151.

FIGS. 10A and 10B are cross-sectional views showing the state in which the collapsible type lens apparatus 200 is extended from the camera body 151, respectively. At that time, the collapsible type lens apparatus 200 can be roughly placed in the wide-angle state (wide-angle lens mode) and the telephoto state (telephoto lens mode), respectively. When the lens apparatus including the linearly movable rolling guide apparatus according to the present invention is applied to the electronic still camera 150 having the above-mentioned arrangement, it is possible to obtain the camera in which the lens apparatus 200 can be collapsed smoothly and reliably.

FIGS. 11A, 11B, 11C, FIGS. 12A, 12B, 12C, 12D and FIGS. 13A, 13B, 13C and 13D are diagrams showing other examples of shapes of fixed members and movable members of the lens-barrels of the lens apparatus according to the present invention, supporting methods of supporting movable members and fixed members and the like, respectively. In FIGS. 11A, 11B, 11C, FIGS. 12A, 12B, 12C, 12D and FIGS. 13A, 13B, 13C and 13D, elements and parts identical to those of the above-described embodiments are denoted by identical reference numerals.

Figure 11A:
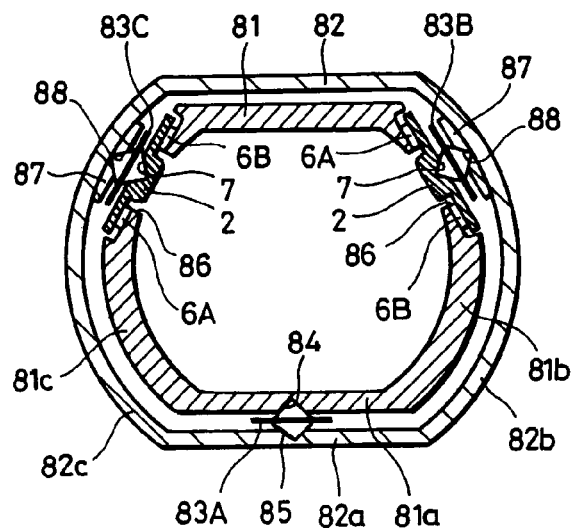

In the example shown in FIG. 11A, a fixed lens-barrel 81 and a movable lens-barrel 82 are formed as oval-shapes (two portions of a circle are formed as parallel two sides), the movable lens-barrel 82 is located at the outside of the fixed lens-barrel 81 with a predetermined gap and the fixed lens-barrel 81 and the movable lens-barrel 82 are supported by three rolling element units 83A, 83B and 83C. As shown in FIG. 11A, the fixed lens-barrel 81 and the movable lens-barrel 82 are located in such a manner that their flat surface portions may be located in the upper and lower direction. A first rolling element unit 83A which serves as a reference rolling element unit to properly position the two lens-barrels 81 and 82 is set to central portions of lower flat surface portions 81a and 82a.

A guide groove 84 having a V-like cross-section and whose cross-sectional shape is continued to the axial direction is provided on the outer surface of the lower flat surface portion 81a of the fixed lens-barrel 81. In response to this guide groove 84, a guide groove 85 having a V-like cross-section and whose cross-sectional shape is continued to the axial direction is provided on the inner surface of the lower flat surface portion 82a of the movable lens-barrel 82. Then, the first rolling element unit 83A is provided between these guide grooves 84 and 85 such that it can be rolled freely.

Also, a second rolling element unit 83B is located on the upper portion of one circular arc surface of the fixed lens-barrel 81 and the movable lens-barrel 82, and a third rolling element unit 83C is located on the upper portion of the other circular arc surface of the fixed lens-barrel 81 and the movable lens-barrel 82. To this end, opening portions 86 and 86 to house therein the guide member 2 are respectively provided on the upper portions of the two circular arc surfaces 81b and 81c of the fixed lens-barrel 81. In response to these opening portions 86 and 86, protruded portions 87 and 87, which are protruded in the inside of the radius direction, are provided on the upper portions of the two circular arc surfaces 82b and 82c of the movable lens-barrel 82. A guide groove 82 having a V-like cross-section and whose cross-sectional shape is continued to the axial direction is provided at substantially the central portion of the inner surface of the respective protruded portions 87 and 87.

The second rolling element unit 83B and the third rolling element unit 83C are respectively provided between the two guide grooves 88 and 88 of the movable lens-barrel 82 and the guide grooves 7 and 7 of the two guide members 2 and 2 held on the fixed lens-barrel 81 in such a manner that they can be rolled freely. Further, the two sets of the leaf springs 6A and 6B serving as the pre-load members are provided between the two guide members 2 and 2 and the fixed lens-barrel 81. These leaf springs 6A and 6B spring-bias the two guide members 2 and 2 toward the outside of the radius direction to apply pre-load of a substantially uniform and predetermined magnitude to the first to third three rolling element units 83A, 83B and 83C. In this case, since the three rolling element units 83A, 83B and 83C are located at the equal interval in the circumferential direction, it is possible to apply pre-load of a magnitude substantially similar to that of the pre-load applied to other rolling element units 83B and 83C to the rolling element unit 83A by providing a structure in which a leaf spring is not used at only one place.

According to the above-mentioned arrangement, similarly to the above-described embodiments, under spring force of the leaf springs 6A and 6B acting from two directions, substantially uniform pre-load can be applied to the three rolling element units 83A, 83B and 83C. Thus, even when the rolling element units 83A, 83B and 83C are located at any positions of the moving direction, the rolling element units 83A, 83B and 83C can be prevented from being sunk, the pre-load applied to the rolling element units 83A, 83B and 83C can be prevented from being varied considerably and the movable lens-barrel 82 can be moved smoothly with high accuracy.

Figure 11B:
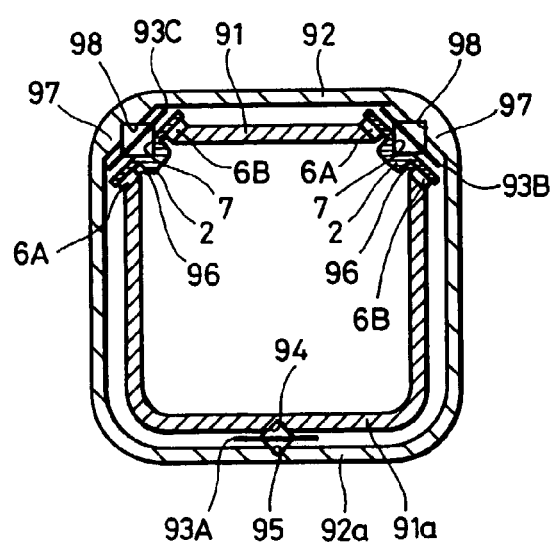

FIG. 11B shows an example of an arrangement in which the fixed lens-barrel 81 and the movable lens-barrel 82 shown in FIG. 11A are formed as a square fixed lens-barrel 91 and a square movable lens-barrel 92 and in which three rolling element units 93A, 93B and 93C are provided between the two lens-barrels 91 and 92. As shown in FIG. 11B, a guide groove 94 having a V-like cross-section and whose cross-sectional shape is continued to the axial direction is provided at substantially the central portion of the outer surface of a lower surface portion 91a of the fixed lens-barrel 91. Concurrently therewith, a guide groove 95 having a V-like cross-section and whose cross-sectional shape is continued to the axial direction is provided at substantially the central portion of the inner surface of a lower surface portion 92a of the movable lens-barrel 92. Then, the first rolling element unit 93A is provided between these guide grooves 94 and 95 in such a manner that it can be rolled freely.

The second rolling element unit 93B is located at one upper corner portion of the fixed lens-barrel 91 and the movable lens-barrel 92 and the third rolling element unit 93C is located at the other upper corner portion of the fixed lens-barrel 91 and the movable lens-barrel 92. To this end, opening portions 96 and 96 to house therein the guide members 2 and 2 are respectively provided on the two upper corner portions of the fixed lens-barrel 91. In response to these opening portions 96 and 96, thick portions 97 and 97 having proper thicknesses are respectively provided on the insides of the two upper corner portions of the movable lens-barrel 92. Two guide grooves 98 and 98 having V-like cross-sections and whose cross-sectional shapes are continued to the axial direction are provided at substantially central portions of the inner surfaces of the two thick portions 97.

The second rolling element unit 93B and the third rolling element unit 93C are respectively provided between the two guide grooves 98 and 98 of the movable lens-barrel 92 and the guide grooves 7 and 7 of the two guide members 2 and 2 held on the fixed lens-barrel 91. Further, the two sets of the leaf springs 6A and 6b serving as the pre-load members are provided between the two guide members 2 and 2 and the fixed lens-barrel 91. These leaf springs 6A and 6B spring-bias the two guide members 2 and 2 toward the outside to apply pre-load of substantially a uniform and predetermined magnitude to the first to third rolling element units 93A to 93C.

In this case, since the three rolling element units 93A, 93B and 93C are located symmetrically with respect to the first rolling element unit 93A, by the arrangement in which the leaf spring is not used at only one portion of the center, it is possible to apply the pre-load of substantially a similar magnitude to the three rolling element units 93A, 93B and 93C.

Figure 11C:
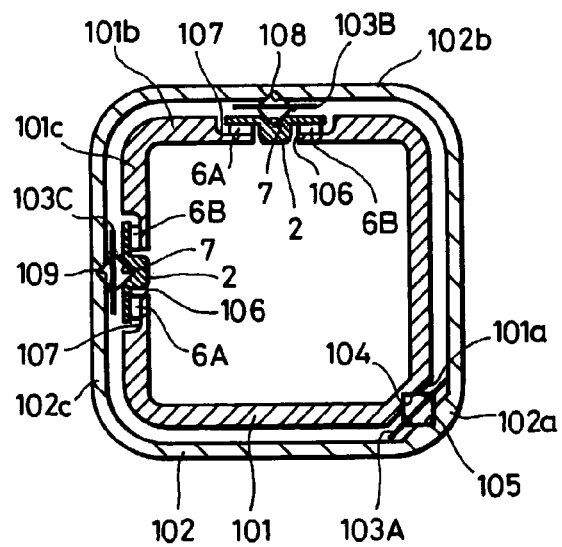

FIG. 11C shows an example in which the arrangements of the three rolling element units 93A, 93B and 93C shown in FIG. 11B are changed, the shapes of the fixed lens-barrel 91 and the movable lens-barrel 92 being the same. As shown in FIG. 11C, a guide groove 104 having a V-like cross-section and whose cross-sectional shape is continued to the axial direction is provided at substantially the central portion of the outer surface of one lower corner portion 101a of the fixed lens-barrel 91. Concurrently therewith, a guide groove 105 having a V-like cross-section and whose cross-sectional shape is continued to the axial direction is provided at substantially the central portion of the inner surface of one lower corner portion 102a of the movable lens-barrel 102. Then, the first rolling element unit 103A is provided between these guide groove 104 and 105 in such a manner that it can be rolled freely.

A second rolling element unit 103B is located on the upper surface portion of the fixed lens barrel 101 and the movable lens-barrel 102 and the third rolling element unit 103C is located on the side surface portion of the opposite side of the guide grooves 104 and 105 of the fixed lens barrel 101 and the movable lens-barrel 102. To this end, opening portions 106 and 106 to house therein the guide members 2 and 2 and dented portions 107 and 107 are respectively provided at substantially the central portion of an upper surface portion 101b of the fixed lens-barrel 101 and at substantially the central portion of a side surface portion 101c. In response to these opening portions 106 and 106 and the like, guide grooves 108 and 109 having V-like cross-sections and whose cross-sectional shapes are continued to the axial direction are respectively provided at substantially the central portion of an upper surface portion 102b of the movable lens-barrel 102 and at substantially the central portion of a side surface portion 102c.

The second rolling element unit 103B and the third rolling element unit 103C are respectively provided between the two guide grooves 108 and 109 of the movable lens-barrel 102 and the guide grooves 7 and 7 of the two guide members 2 and 2 held on the fixed lens-barrel 101 in such a manner that they can be rolled freely. Further, the two sets of the leaf springs 6A and 6B serving as the pre-load members are provided between the two guide members 2 and 2 and the fixed lens-barrel 101. These leaf springs 6A and 6B spring-bias the two guide members 2 and 2 toward the outside to apply pre-load of substantially uniform and predetermined magnitude to the first to third three rolling element units 103A, 103B and 103C.

In this case, since the three rolling element units 103A, 103B and 103C are located symmetrically in the diagonal line direction with respect to the first rolling element unit 103A, by the structure in which the leaf spring is not used only at the central one place, it is possible to apply pre-load of substantially a similar magnitude to the three rolling element units 103A, 103B and 103C.

Figure 12A:
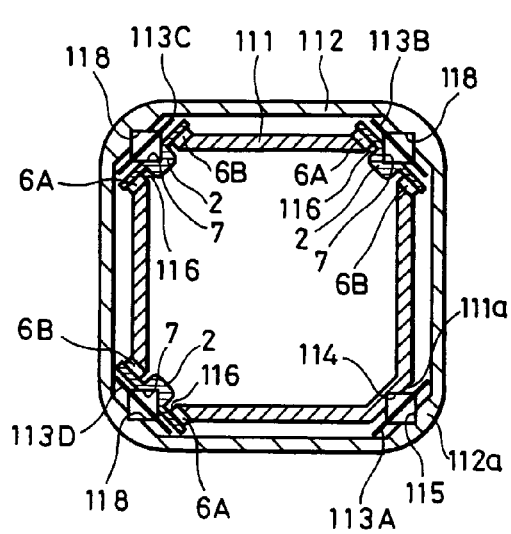

FIG. 12A shows an example of an arrangement in which a fixed lens-barrel 111 and a movable lens-barrel 112 are formed as square shapes, four rolling element units 113A, 113B, 113C and 113D being located at four corner portions. As shown in FIG. 12A, a guide groove 114 having a V-like cross-section and whose cross-sectional shape is continued to the axial direction is provided at substantially the central portion of the outer surface of one lower corner portion 111a of the fixed lens-barrel 111. In response to the guide groove 114, a guide groove 115 having a V-like cross-section and whose cross-sectional shape is continued to the axial direction is provided at substantially the central portion of the inner surface of a lower right corner portion 112a of the movable lens-barrel 112. Then, the first rolling element unit 113A is provided between the guide grooves 114 and 115 in such a manner that it can be rolled freely.

The second rolling element unit 113B is located at the upper right corner portion of the fixed lens-barrel 111 and the movable lens-barrel 112, the third rolling element unit 113C is located at the upper left corner portion of the fixed lens-barrel 111 and the movable lens-barrel 112 and the fourth rolling element unit 113D is located at the lower left corner portion of the fixed lens-barrel 111 and the movable lens-barrel 112. To this end, opening portions 116 and 116 to house therein the guide members 2 and 2 are respectively provided at three corner portions except the lower right corner portion 112a of the fixed lens-barrel 111. In response to these opening portions 116 and 116, guide grooves having V-like cross-sections and whose cross-sectional shapes are continued to the axial direction are respectively provided at other three corner portions than the lower right corner portion of the movable lens-barrel 112.

The second rolling element unit 113B, the third rolling element unit 113C and the fourth rolling element unit 113D are respectively provided at three portions among the three guide grooves 118, 118 and 118 of the movable lens-barrel 112 and the guide grooves 7, 7 and 7 of the three guide members 2, 2 and 2 held on the fixed lens-barrel 111 in such a manner that they can be rolled freely. Further, the three sets of the leaf springs 6A and 6B serving as the pre-load members are respectively provided between the three guide members 2, 2 and 2 and the fixed lens-barrel 111. These leaf springs 6A and 6B respectively spring-bias the three guide members 2, 2 and 2 toward the outside to apply pre-load of substantially a uniform and predetermined magnitude to the first to fourth four rolling element units 113A to 113D.

In this case, since the four rolling element units 113A, 113B, 113C and 113D are located symmetrically in the diagonal line direction with respect to the first rolling element unit 113A, by the structure in which the leaf spring is not used at only one central portion, it is possible to apply the pre-load of substantially a similar magnitude to the four rolling element units 113A, 113B, 113C and 113D.

Figure 12B:
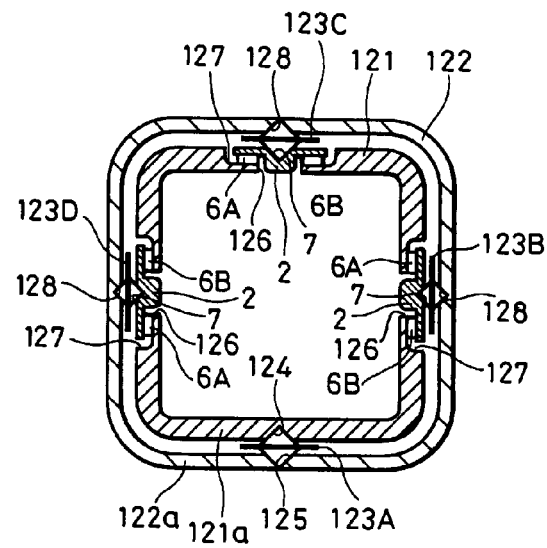

FIG. 12B shows an example in which the arrangements of the four rolling element units 113A, 113B, 113C and 113D shown in FIG. 12A are changed. Specifically, while the four rolling element units 113A, 113B, 113C and 113D are located at the four corner portions of the square fixed lens-barrel 111 and the square movable lens-barrel 112 in the embodiment shown in FIG. 12A, according to this embodiment, four rolling element units 123A, 123B, 123C and 123D are located at substantially central portions of four flat surface portions of a fixed lens-barrel 121 and a movable lens-barrel 122.

As shown in FIG. 12B, a guide groove 124 having a V-like cross-section and whose cross-sectional shape is continued to the axial direction is provided at substantially a central portion of the outer surface of a lower surface portion 121a of the fixed lens-barrel 121. A corresponding guide groove 125 having a V-like cross-section and whose cross-sectional shape is continued to the axial direction is provided at substantially a central portion of the inner surface of a lower surface portion 122a of the movable lens-barrel 122. Then, the first rolling element unit 123A is provided between these guide grooves 124 and 125 in such a manner that it can be rolled freely.

An opening portion 126 and a dented portion 127 are respectively provided at substantially central portions of other three flat surface portions than the lower surface portion 121a of the fixed lens-barrel 121. In response to these opening portions 126 and the like, guide grooves 128 having V-like cross-sections and whose cross-sectional shapes are continued to the axial direction are respectively provided on all of other three flat surface portions than the lower surface portion 122a of the movable lens-barrel 122.

The second rolling element unit 123B, the third rolling element unit 123C and the fourth rolling element unit 123D are respectively provided at the three guide grooves 128, 128 and 128 of the movable lens-barrel 122 and the guide grooves 7, 7 and 7 of the three guide members 2, 2 and 2 held on the fixed lens-barrel 121 in such a manner that they can be rolled freely. Further, the three sets of the leaf springs 6A and 6B serving as the pre-load members are respectively provided between the three guide members 2, 2 and 2 and the fixed lens-barrel 121. When the three guide members 2, 2 and 2 are spring-biased toward the outside by these leaf springs 6A and 6B, pre-load of substantially a uniform and predetermined magnitude can be applied to the first to fourth four rolling element units 123A, 123B, 123C and 123D.

Also in this case, similarly to FIG. 12A, since the four rolling element units 123A, 123B, 123C and 123D are located symmetrically in the right and left direction with respect to the first rolling element unit 123A, by using the structure in which the leaf spring is not used at only one central portion, it is possible to apply pre-load of substantially similar magnitude to the four rolling element units 123A, 123B, 123C and 123D.

Figure 12C:
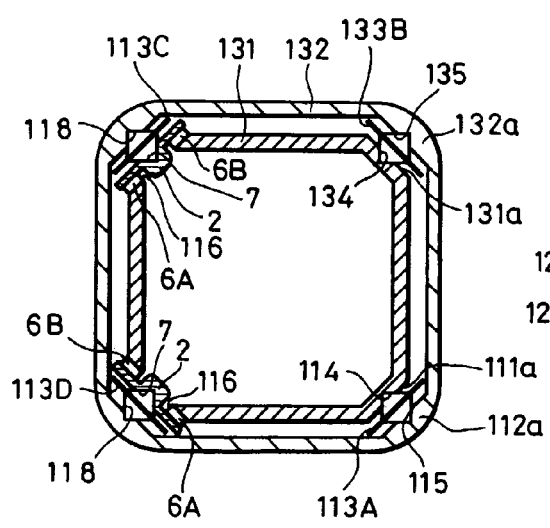

An example shown in FIG. 12C is a modified example of the example shown in FIG. 12A in which the supporting structure which does not use the guide member 2 is applied to two portions. Specifically, a supporting structure of the lower right corner portions of a fixed lens-barrel 131 and a movable lens-barrel 132 is also applied to the upper right corner portion. Concurrently therewith, as shown in FIG. 12C, a guide groove 134 having a V-like cross-section and whose cross-sectional shape is continued to the axial direction is provided at substantially a central portion of the outer surface of a right upper corner portion 131a of the fixed lens-barrel 131. A corresponding guide groove 135 having a V-like cross-section and whose cross-sectional shape is continued to the axial direction is provided substantially at a central portion of the inner surface of an upper right corner portion 132a of the movable lens-barrel 132. Then, the second rolling element unit 133B is provided between these guide grooves 134 and 135 such that it can be rolled freely. A rest of arrangements is identical to that of FIG. 12A.

Figure 12D:
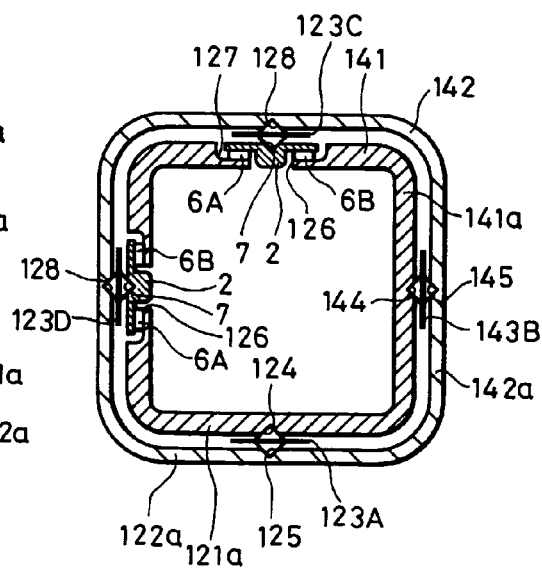

An example shown in FIG. 12D is a modified example of the example shown in FIG. 12B in which the supporting structure which does not use the guide member 2 is applied to two portions. Specifically, a supporting structure of the lower surface portion of a fixed lens-barrel 141 and a movable lens-barrel 142 is also applied to the right side surface portion. Concurrently therewith, as shown in FIG. 12D, a guide groove 144 having a V-like cross-section and whose cross-sectional shape is continued to the axial direction is provided at substantially a central portion of a right side surface portion 141a of the fixed lens-barrel 141. A corresponding guide groove having a V-like cross-section and whose cross-sectional shape is continued to the axial direction is provided at substantially a central portion of the inner surface of a right side surface portion 142a of the movable lens-barrel 142. Then, a second rolling element unit 143B is provided between these guide groove 144 and 145 such that it can be rolled freely. A rest of arrangements is identical to that of FIG. 12B.

Figure 13A:
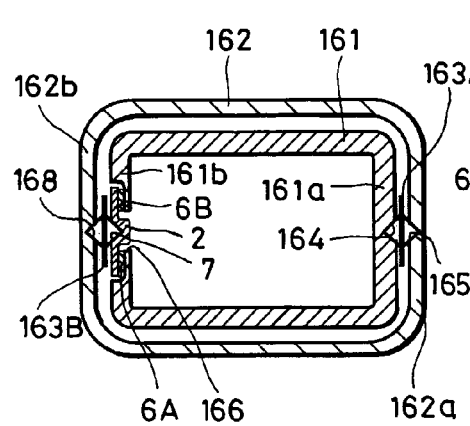

FIG. 13A shows an example of an arrangement in which the fixed lens-barrel 161 and the movable lens-barrel 162 are formed as a square fixed lens-barrel and a square movable lens-barrel, two rolling element units 163A and 163B being located at central portions of two short sides. As shown in FIG. 13A, a guide groove 164 having a V-like cross-section and whose cross-sectional shape is continued to the axial direction is provided at substantially a central portion of the outer surface of one short side 161a of the fixed lens-barrel 161. A corresponding guide groove 165 having a V-like cross-section and whose cross-sectional shape is continued to the axial direction is provided at substantially a central portion of the inner surface of one short side 162a of the movable lens-barrel 162. Then, a first rolling element unit 163A is provided between these guide grooves 164 and 165 in such a manner that it can be rolled freely.

A second rolling unit 163B is located at the other short sides 161b and 162b of the fixed lens-barrel 161 and the movable lens-barrel 162. To this end, an opening portion 166 to house therein the guide member 2 is provided at substantially a central portion of the other short side of the fixed lens-barrel 161. In response to this opening portion 166, a guide groove 168 having a V-like cross-section and whose cross-sectional shape is continued to the axial direction is provided at substantially a central portion of the other short side 162b of the movable lens-barrel 162.

The second rolling element unit 163B is provided between the guide groove 168 of the movable lens-barrel 162 and the guide groove 7 of the guide member 2 held on the fixed lens-barrel 161 in such a manner that it can be rolled freely. Further, the pair of the leaf springs 6A and 6B serving as the pre-load members are provided between the guide member 2 and the fixed lens-barrel 161. When the guide member 2 is spring-biased toward the outside by these leaf springs 6A and 6B, pre-load of substantially a uniform and predetermined magnitude can be applied to the first and second two rolling element units 163A and 163B. In this case, since the two rolling element units 163A and 163B are located symmetrically in the right and left direction, by using the structure in which the leaf spring is not used at one rolling element unit 163A, it is possible to apply pre-load of substantially a similar magnitude to the two rolling element units 163A and 163B.

Figure 13C:
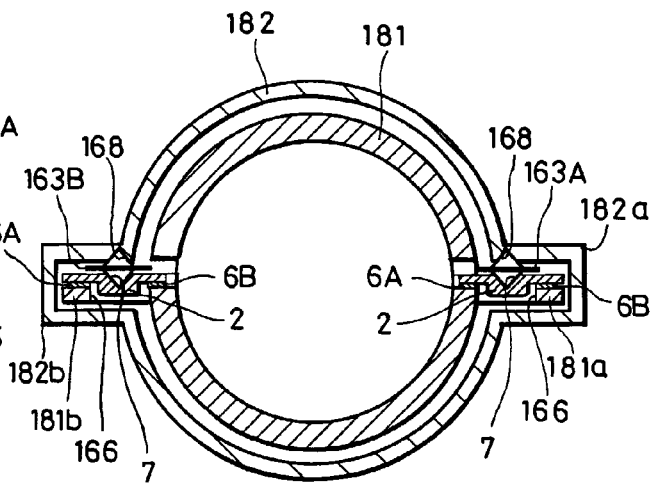
Figure 13B:
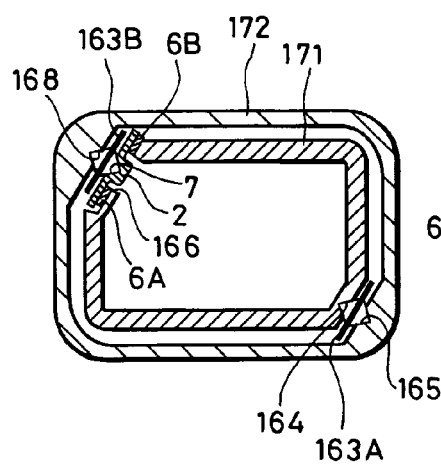

FIG. 13B shows an example in which the arrangements of the two rolling element units 163A and 163B shown in FIG. 13A are changed. Specifically, while the two rolling element units 163A and 163B are provided at the two short sides of the rectangular fixed lens-barrel 161 and the rectangular movable lens-barrel 162 in the embodiment shown in FIG. 13A, according to this embodiment, the rolling element units 163A and 163B are located at two portions in one diagonal line direction of a fixed lens-barrel 171 and a movable lens-barrel 172. A rest of arrangements is identical to that of the embodiment shown in FIG. 13A.

FIG. 13C shows an example of an arrangement in which the two rolling element units 163A and 163B are located at the positions deviated toward the outside of the radius direction from the plane passing through the optical axis of the lens. As shown in FIG. 13C, a fixed lens-barrel 181 and a movable lens-barrel 182 are both cylindrical in shape, and the movable lens-barrel 182 is fitted into the outside of the fixed lens-barrel 181 with a predetermined gap. A pair of overhang portions 181a and 181b, which are extended in the axial direction, may be provided on the outer peripheral surface of the fixed lens-barrel 181. The pair of the overhang portions 181a and 181b may be located at the positions displaced 180°. Concurrently therewith, bag-like overhang housing portions 182a and 182b having U-like cross-sections and which are protruded in the outside of the radius direction are provided on the movable lens-barrel 182.

Opening portions 166 and 166 to house therein the guide members 2 and 2 are provided on the pair of overhang portions 181a and 181b of the fixed lens-barrel 181. The guide members 2 and 2 are housed in these opening portions 166 and 166 through the pair of the leaf springs 6A and 6B. Guide grooves 168 and 168 of the movable lens-barrel 182 are provided on the inner surfaces of the overhang housing portions 182a and 182b corresponding to the respective guide grooves 7 and 7 of the pair of these guide members 2 and 2. Then, the two rolling element units 163A and 163B are respectively provided between the pair of the guide grooves 168 and 168 of movable lens-barrel 182 and the respective guide grooves 7 and 7 of the pair of the guide members 2 and 2 in such a manner that they can be slid freely.

Figure 13D:
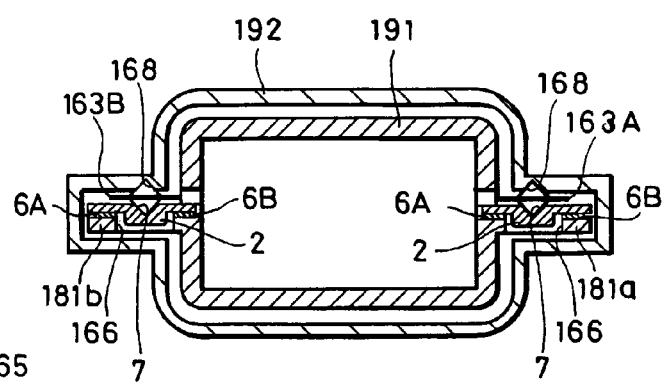

FIG. 13D shows an example in which the shapes of the fixed lens-barrel and the movable lens-barrel shown in FIG. 13C are changed. Specifically, while the fixed lens-barrel 181 and the movable lens-barrel 182 are circular in shape in the embodiment shown in FIG. 13C, the fixed lens-barrel 181 and the movable lens-barrel 182 are formed as rectangular ones to provide a fixed lens-barrel 191 and a movable lens-barrel 192. A rest of arrangements is identical to that shown in FIG. 13C.

According to the arrangements shown in FIGS. 11B, 11C, FIGS. 12A, 12B, 12C, 12D and FIGS. 13A, 13B, 13C and 13D, similarly to FIG. 11A and FIG. 9, pre-load of substantially a uniform magnitude can be applied to more than two (two, three, four or more than four rolling element units) rolling element units by using spring force of the leaf springs 6A and 6B. Therefore, even when the rolling element units are located at any positions in the moving direction, the rolling element units can be avoided from being sunk, the pre-load applied to the rolling element units can be prevented from being changed considerably and the movable lens-barrel can be smoothly moved with high accuracy. It is sufficient that the supporting portion including the pre-load member may be provided at more than one position. Having considered balance of pre-load, it is preferable that the supporting portion including the pre-load member should be provided at more than two portions.

Figure 14:
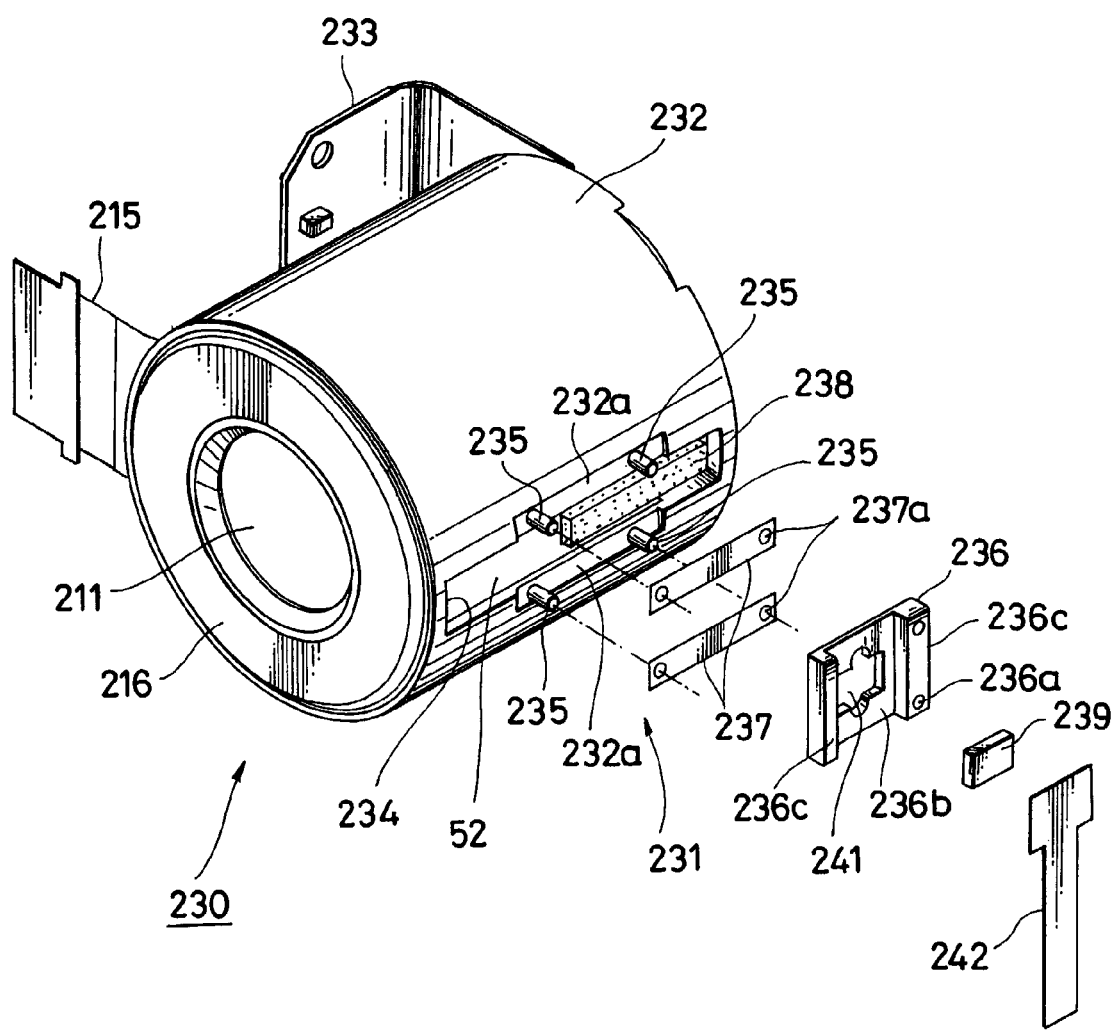
FIG. 14 is an exploded perspective view showing a lens apparatus according to a second embodiment of the present invention, that is, a position detecting means.

FIG. 14 is a perspective view showing an embodiment of a lens apparatus 230 including a position detecting means to detect the position of a first movable lens-barrel 52. Since this embodiment is different from the above-described embodiments only in the presence of a position detecting sensor 231 which is the position detecting means, the position detecting sensor 231 will be described herein. Hence, identical other arrangements are denoted by identical reference numerals and need not be described.

In FIG. 14, reference numeral 14 denotes an exterior lens-barrel and the first movable lens-barrel 52, a first fixed lens-barrel and the like, not shown, are housed in the inside of this exterior lens-barrel 232. The exterior lens-barrel 232 is provided with an attachment flange 233, and the lens apparatus 230 is attached to the camera body through the attachment flange 233. The position detecting sensor 231 is attached to the side surface portion of this exterior lens-barrel 232. To this end, an oblong 234, which is extended in parallel to the optical axis direction, is formed on the side surface portion of the exterior lens-barrel 232. Flat surface portions 232a and 232a to attach the position detecting sensor 231 are formed on both sides of the width direction of this oblong hole 234.

Two positioning pins 235 and 235 are provided on the flat surface portions 232a and 232a of the exterior lens-barrel 232 with a predetermined gap therebetween. A sensor holding frame 236 is properly positioned by these pins 235 and 235 and thereby fixed to the side surface of the exterior lens-barrel 232 through a pair of spacers 237 and 237. The pair of spacers 237 and 237 are brought in contact with the respective flat surface portions 232a and 232a on which the sensor holding frame 236 is extended so as to cross the oblong hole 234. To this end, the sensor holding frame 236 has defined therein four holes 236a into which the four pins 235 are fitted and the pair of spacers 237 and 237 have defined therein holes 237a into which the two pins 235 are inserted.

The position detecting sensor 231 is composed of an MR (magnetoresistive) magnet (magnetic scale) 238 and an MR sensor (magnetic sensing sensor) 239. The MR magnet 238 is formed of a long and narrow rod-like magnetic material on which N poles and S poles are alternately magnetized at a very small pitch. The MR magnet 238 is fixed to the outer peripheral surface of the first movable lens-barrel 52 by a suitable fixing means such as an adhesive while its longitudinal direction is made in parallel to the optical axis of the lens. The MR magnet 238 is housed within the oblong hole 234 of the exterior lens-barrel 232 and its height is set in such a manner that it may be prevented from contacting with the inner surface of the sensor holding frame 236.

In this case, the height of the MR magnet 238 can be set by the following means, for example.

(1) A first means for setting the height of the MR magnet 238 is to decrease the thickness of the MR magnet 238 sufficiently. Specifically, the thickness of the MR magnet 238 is made thinner than the thickness of the flat surface portion 232a of the exterior lens-barrel 232 so that, when the MR magnet 238 is attached to the outer peripheral surface of the first movable lens-barrel 52, a proper gap is set between its surface and the inner surface of the sensor holding frame 236 to thereby prevent the MR magnet 238 from contacting with the sensor holding frame 236.

(2) A second means for setting the height of the MR magnet 238 is suitable for the application to the case in which the thickness of the MR magnet 238 may not be decreased as in the case (1) and in which a concave portion is formed on the first movable lens-barrel 52, whereby a part of the MR magnet 238 can be buried into the first movable lens-barrel 52.

(3) A third means for setting the height of the MR magnet 238 is suitable for the application to the case in which the thickness of the MR magnet 238 may not be made thinner that the thickness of the first movable lens-barrel 52 and in which the flat surface portion 232a of the first movable lens-barrel 52 is built up so that the sensor holding frame 236 may be supported at the position higher than the thickness of the first movable lens-barrel 52.

In addition, various kinds of structure can be applied insofar as the structures can allow the first movable lens-barrel 52 to be moved forward and backward while the MR magnet 238 fixed to the first movable lens-barrel 52 can be prevented from contacting with the sensor holding frame 236 fixed to the exterior lens-barrel 232. After the position detecting sensor 231 was attached to the side surface portion of the exterior lens-barrel 232, the oblong hole 234 may be closed by a suitable means such as a cover in order to protect the oblong hole 234 from being smudged by dusts. A cover member for covering the circumference of the position detecting sensor 231 may be provided as the above-mentioned cover. Also, cover members for covering the opening portion of the oblong hole 234 may be provided in the left and right direction of the sensor holding frame 236.

The sensor holding frame 236 is composed of a square holding portion 236b to which the MR sensor 239 is attached and attachment portions 236c and 236c provided on opposing two sides of the holding portion 236b. Two holes 236a and 236a are formed on the two attachment portions 236c and 236c. Also, the holding portion 236b has at its substantially central portion defined a through-hole 241 through which magnetic fields of the MR magnet 238 may pass. The MR sensor 239 is fixed to the outer surface of the holding portion 236b by a suitable means such as an adhesive in such a fashion that the magnetic sensing surface of the MR sensor 239 may be opposed to this through-hole 241.

The MR sensor 239 is adapted to detect intensity of magnetic fields outputted from the MR magnet 238. The MR sensor 239 is mounted at predetermined position of an electric circuit of a sensor wiring plate 242 and it is electrically connected to the electric circuit. The magnetic sensing surface of this MR sensor 239 is opposed to the surface of the MR magnet 238 and the magnetic sensing surface of the MR sensor 239 is made parallel to the surface of the MR magnet 238. In that case, by adjusting the thicknesses of the pair of the spacers 237 and 237, the attachment position of the MR sensor 239 is changed to adjust the gap between the MR sensor 239 and the MR magnet 238.

According to the above-mentioned arrangement, the position of the first movable lens-barrel 52 including the one-group lens holding frame 216 can be detected by the position detecting sensor 231. Specifically, when the first movable lens-barrel 52 is moved in the optical axis direction, it is possible to detect the position of the first movable lens-barrel 52 relative to the first fixed lens-barrel 51, that is, the position of the first movable lens-barrel 52 in the optical axis direction by detecting the change of intensity of the magnetic field of the MR magnet 238 with the MR sensor 239. When the output from the MR sensor 239 is obtained, it is possible to control the position of the first movable lens-barrel 52 by controlling the operation of the first movable lens-barrel 52.

As described above, according to the present invention, the movable lens-barrel holding means is formed as the linearly movable rolling bearing and the movable lens-barrel driving means is formed as the linear motor driving means, whereby the movable lens-barrels located inside and outside the fixed lens-barrel can be operated independently. To this end, since the linearly movable bearing mechanism is used as the bearing holding portion, as compared with the related-art holding mechanism based on sliding friction, frictional resistances obtained when the lens apparatus is activated and it is being operated can be made extremely small. Thus, it becomes possible to drive the lens apparatus by a non-contact linear motor with small power based on power saving. Further, since the lens apparatus can be avoided from being restricted by the cam groove unlike the related art, freedom in optical design can be increased and design efficiency can be increased. In addition, since the sliding portion does not need a lubrication material such as grease, working efficiency in the assembly can be improved, production efficiency can be improved and a cost can be decreased.

Also, according to the present invention, since the lens apparatus has the structure in which proper pre-load can be applied to the rolling elements while it has the simple structure, uniform pre-load can be applied to the rolling elements by using the pre-load member. Further, regardless of the moving position of the rolling elements, inclinations of the moving directions of the guide members and the rolling element units can be decreased and hence the movable member can be moved smoothly. In addition, since the sliding portion can be prevented from being wobbled, it is possible to alleviate restrictions on optical sensitivity while shaking of shot images and dropout of images can be decreased. Further, since the pre-load applied to the rolling element units need not be adjusted and accuracy of the rolling elements can be alleviated, the inexpensive assemblies can apply substantially uniform pre-load to the whole of the lens apparatus and more stable linear operations can be realized.

Further, according to the present invention, since the movable lens-barrel is moved linearly and it is never rotated, the lens-barrel need not be formed as the circular and lens-barrels whose cross-sectional shapes are various shapes such as square, other polygons, ellipse or oval can be applied to the present invention. Therefore, freedom in optical design can be improved so that the lens apparatus can be mounted and designed with larger freedom. Further, since a reduction gear need not be used unlike the related art, a disturbing portion such as a large protruded portion can be avoided from being generated and hence a small collapsible lens apparatus with excellent operation property can be obtained. In addition, quick collapsing operations and auto-focus operations become possible.

Further, according to the present invention, since the lens apparatus has no gear mechanism and no surface-contact sliding portion, the movable lens-barrel can be operated at higher speed. Also, while the movable lens-barrel is operated at high speed, operation sounds can be prevented from being generated and hence silent collapsing operation becomes possible. Also, since the driving means of the movable lens-barrel is of the linear motor driving, frictional resistance generated when the lens apparatus is collapsed is small so that the movable lens-barrel can be accommodated into the camera body at high speed. Thus, durability required when the lens apparatus is shocked upon inadvertent dropping can be improved. Further, it becomes possible to carry out moving picture recording, which needs continuous shooting and audio recording, such as recording in the zoom operation and auto-focus operation.

As described above, according to the present invention, it is possible to provide a linear motor drive small collapsible lens apparatus that can achieve the above-mentioned many effects which might not be realized by the related-art cam groove trace type collapsible lens and the image pickup apparatus using such lens apparatus.

As set forth above, the present invention is not limited to the above-described embodiments. While the embodiments in which the image pickup apparatus according to the present invention is applied to the electronic still camera (that is, digital camera) in the above-described embodiments, the present invention is not limited thereto and it is needless to say that the present invention can be applied to image pickup apparatus of other systems, such as a video camera, a personal computer with a camera and a PDA (personal digital assistant).

DESCRIPTION OF REFERENCE NUMERALS 1, 31, 41 . . . linearly movable rolling guide apparatus
2, 2A, 2B, 45 . . . guide member
3, 46 . . . movable member
4 . . . fixed member
5 . . . rolling element unit
5A, 5B, 5C . . . first rolling element unit
6A, 6B . . . leaf spring (pre-load member)
7 . . . first guide groove
7A, 7B, 67 . . . fixed-side first guide groove
8 . . . second guide groove
14 . . . cylindrical roller (rolling element)
15 . . . holding device
26, 26A, 26B . . . coil
27, 27A, 27B . . . wiring plate
32A, 32B . . . plate-like permanent magnet (pre-load member)
48, 232 . . . exterior lens-barrel
49, 204 . . . permanent magnet
50 . . . lens lens-barrel
51, 201 . . . fixed lens-barrel
52, 202 . . . movable lens-barrel
56A, 56B . . . opening portion
59A, 59B, 59C . . . movable-side first guide groove
65A, 65B, 65C . . . second rolling element unit
66, 75A, 75B . . . fixed-side second guide groove
69A, 69B . . . guide plate
72, 73, 74 . . . movable-side second guide groove
150 . . . electronic still camera (image pickup apparatus)
151 . . . camera body (image pickup apparatus body)
200, 230 . . . lens apparatus
211 . . . one-group lens
212 . . . two-group lens
213 . . . three-group lens
214 . . . CCD (image pickup means)
216, 217, 218 . . . image pickup means
231 . . . position detecting sensor (position detecting means)
234 . . . oblong
235 . . . pin
236 . . . sensor holding frame
237 . . . spacer
238 . . . MR magnet (magnetic scale)
239 . . . MR sensor (magnetic sensing sensor)
278 . . . rear lens-barrel

The invention claimed is:

1. A lens apparatus comprising:
a fixed lens-barrel including a plurality of fixed-side first guide grooves extended straight and which are formed on an outer peripheral surface in parallel to each other and a plurality of second guide grooves extended straight and which are formed on an inner peripheral surface in parallel to each other;
a first movable lens-barrel to hold a first lens at the outside of said fixed lens-barrel and which includes a plurality of movable-side first guide grooves extended straight, said plurality of movable-side first guide grooves being opposed to said fixed-side first guide grooves with a predetermined gap in parallel to each other;
a second movable lens-barrel to hold a second lens of which optical axis is coincident with that of said first lens at the inside of said fixed lens barrel and which includes a plurality of movable-side second guide grooves extended straight, said plurality of movable-side second guide grooves being opposed to said fixed-side second guide grooves with a predetermined gap in parallel to each other;
more than two first rolling element units including a plurality of rolling elements being provided between said fixed-side first guide grooves and said movable-side first guide grooves so as to become able to freely roll and which supports said first movable lens-barrel to said fixed lens-barrel such that said movable lens-barrel can be moved in the optical axis direction of said lens; and
more than two second rolling element units including a plurality of rolling elements provided between said fixed-side second guide grooves and said movable-side second guide grooves so as to become able to freely roll and which supports said second movable lens-barrel to said fixed lens-barrel such that said second movable lens-barrel can be moved in the optical axis direction of said lens, wherein said first and second movable lens-barrels are supported to said fixed lens-barrel such that they can be independently moved in the optical axis directions of said first and second lenses.

2. A lens apparatus according to claim 1, further comprising a guide member provided in association with at least one of said more than two first rolling element units and said more than two second rolling element units and a pre-load member for spring-biasing said guide member to said rolling element unit to apply pre-load to said rolling element unit.

3. A lens apparatus according to claim 2, wherein said pre-load member is composed of one or more than two combinations of one or more than two leaf springs, coil springs or rubber-like resilient materials.

4. A lens apparatus according to claim 1, wherein said more than two first rolling element units and said more than two second rolling elements are located in the circumferential direction of said fixed lens-barrel with an equal interval.

5. A lens apparatus according to claim 1, wherein said more than two first rolling element units and said more than two second rolling element units are located on a concentric circle around said optical axis.

6. A lens apparatus according to claim 1, wherein said fixed lens-barrel and said first and second movable lens-barrels are formed of circular, elliptic, oval, square or polygonal cylindrical bodies.

7. A lens apparatus according to claim 1, further comprising position detecting means for detecting the position at which said first movable lens-barrel and/or said second movable lens-barrel is located relative to said fixed lens-barrel in the optical axis direction of said lens to output its detected signal.

8. A lens apparatus according to claim 1, further comprising first driving means for moving said first movable lens-barrel in said optical axis direction and second driving means for moving said second movable lens-barrel in said optical axis direction and wherein said first and second driving means include a first coil fixed to said first movable lens-barrel, a second coil fixed to said second movable lens-barrel and a magnetic circuit portion passing through said first and second coils and which forms a magnetic closed circuit.

9. An image pickup apparatus comprising:
a lens apparatus which is comprised of:
a fixed lens-barrel including a plurality of fixed-side first guide grooves extended straight and which are formed on an outer peripheral surface in parallel to each other and a plurality of second guide grooves extended straight and which are formed on an inner peripheral surface in parallel to each other;
a first movable lens-barrel to hold a first lens at the outside of said fixed lens-barrel and which includes a plurality of movable-side first guide grooves extended straight, said plurality of movable-side first guide grooves being opposed to said fixed-side first guide grooves with a predetermined gap in parallel to each other;
a second movable lens-barrel to hold a second lens of which optical axis is coincident with that of said first lens at the inside of said fixed lens barrel and which includes a plurality of movable-side second guide grooves extended straight, said plurality of movable-side second guide grooves being opposed to said fixed-side second guide grooves with a predetermined gap in parallel to each other;
more than two first rolling element units including a plurality of rolling elements being provided between said fixed-side first guide grooves and said movable-side first guide grooves so as to become able to freely roll and which supports said first movable lens-barrel to said fixed lens-barrel such that said movable lens-barrel can be moved in the optical axis direction of said lens; and
more than two second rolling element units including a plurality of rolling elements provided between said fixed-side second guide grooves and said movable-side second guide grooves so as to become able to freely roll and which supports said second movable lens-barrel to said fixed lens-barrel such that said second movable lens-barrel can be moved in the optical axis direction of said lens, wherein said lens apparatus supports said first and second movable lens-barrels to said fixed lens-barrel such that they can be independently moved in the optical axis directions of said first and second lenses.

* * * * *